US009198183B2

(12) United States Patent
Anand et al.

(10) Patent No.: US 9,198,183 B2
(45) Date of Patent: Nov. 24, 2015

(54) ACCOMMODATING MULTI-SIM-MULTI-STANDBY COMMUNICATION DEVICE TUNEAWAY EVENTS AT A COMMUNICATION NETWORK BASE STATION

(71) Applicant: QUALCOMM Incorporated, San Diego, CA (US)

(72) Inventors: Raghavendra Shyam Anand, Hyderabad (IN); Shailendra Singh Verma, Hyderabad (IN)

(73) Assignee: QUALCOMM, Incorporated, San Diego, CA (US)

( * ) Notice: Subject to any disclaimer, the term of this patent is extended or adjusted under 35 U.S.C. 154(b) by 268 days.

(21) Appl. No.: 13/921,435

(22) Filed: Jun. 19, 2013

(65) Prior Publication Data

US 2014/0378152 A1 Dec. 25, 2014

(51) Int. Cl.
*H04W 72/00* (2009.01)
*H04W 72/04* (2009.01)
*H04W 60/00* (2009.01)
*H04W 76/04* (2009.01)
H04W 8/18 (2009.01)
H04W 88/06 (2009.01)

(52) U.S. Cl.
CPC .......... *H04W 72/048* (2013.01); *H04W 60/005* (2013.01); *H04W 76/048* (2013.01); *H04W 8/18* (2013.01); *H04W 88/06* (2013.01)

(58) Field of Classification Search
CPC .............. H04W 88/06; H04W 76/048; H04W 36/0066; H04W 36/0083; H04W 68/12; H04W 36/08; H04W 72/12; H04W 36/18; H04W 36/30; H04W 48/18; H04W 36/00; H04W 52/221

USPC ............. 455/450–453, 507, 509–516, 552.1, 455/552.3, 132–134, 161.1–161.3, 226.1, 455/226.2, 553.1; 370/328, 329
See application file for complete search history.

(56) References Cited

U.S. PATENT DOCUMENTS 8,064,405 B2 11/2011 Parekh et al.
8,331,942 B2 12/2012 Usuda et al.
8,346,270 B1 * 1/2013 Singh et al. ................... 455/445

(Continued)

OTHER PUBLICATIONS

International Search Report and Written Opinion—PCT/US2014/041443—ISA/EPO—Dec. 19, 2014.

*Primary Examiner* — Allahyar Kasraian
(74) *Attorney, Agent, or Firm* — The Marbury Law Group, PLLC

(57) ABSTRACT

In overview, the various embodiments describe methods for configuring a nodeB to recognize tuneaway events and to operate in a manner that mitigates the adverse effects of user equipment (UE) tuneaways on network capacity. In the various embodiments, the nodeB may detect that a UE is periodically tuning away based on the periodic, characteristic nature of the drops in the UE's signal strength. When the nodeB recognizes that a UE is performing periodic tuneaways, the nodeB may implement various resource management strategies while the UE is in a tuneaway gap to minimize the impact of the UE's tuneaway gaps and may resume normal resource management operations when the UE is not in a tuneaway gap. Thus, the various embodiments enable the nodeB to determine and manage the effects of a UE's tuneaway gaps, thereby increasing network capacity, optimizing power management, and enhancing the overall user experience.

52 Claims, 14 Drawing Sheets

(56) References Cited

U.S. PATENT DOCUMENTS

| | | |
|---|---|---|
| 8,355,725 B2 | 1/2013 | Nylander et al. |
| 8,452,312 B1 * | 5/2013 | Oroskar et al. ............... 455/458 |
| 2008/0310357 A1 | 12/2008 | Ulupinar et al. |
| 2011/0217969 A1 | 9/2011 | Spartz et al. |
| 2012/0190362 A1 | 7/2012 | Subbarayudu et al. |
| 2013/0017817 A1 * | 1/2013 | Kim et al. .................... 455/418 |
| 2013/0023275 A1 | 1/2013 | Mutya et al. |

* cited by examiner

ACCOMMODATING MULTI-SIM-MULTI-STANDBY COMMUNICATION DEVICE TUNEAWAY EVENTS AT A COMMUNICATION NETWORK BASE STATION

BACKGROUND

Some new designs of mobile communication devices support multiple Subscriber Identity Module (SIM) cards that provide users with access to multiple separate mobile telephony networks. Examples of mobile telephony networks include GSM, TDSCDMA, CDMA2000, and WCDMA. Example multi-SIM mobile communication devices include mobile phones, laptop computers, smart phones, and other mobile communication devices that are enabled to connect to multiple mobile telephony networks. A mobile communication device that includes two SIM cards that share one radio frequency (RF) resource for communicating with their respective mobile telephony networks and connects to two separate mobile telephony networks is termed a "dual-SIM-dual-standby (DSDS) communication device" or a "DSDS communication device." A DSDS communication device, like other computing devices that connect to a cellular telephone network, are commonly referred to as "user equipment" or "UE."

A DSDS communication device may include one shared RF resource that the two subscriptions use to communicate with their respective mobile telephony networks. Only one subscription at a time may use the shared RF resource to communicate with its mobile network. However, even when a subscription is in "standby" mode, meaning it is not currently actively communicating with the network, it may still need to perform discontinuous reception (DRX) operations to receive network paging messages at regular intervals (i.e., a discontinuous reception period) in order to remain connected to the network. Paging intervals for different subscriptions are not necessarily the same nor are they synchronized. Therefore, occasionally the multiple subscriptions sharing an RF resource may need to use the RF resource to communicate with their respective mobile networks simultaneously. To accommodate such network access "collisions," DSDS communication devices may perform IDLE mode activities for one subscription in IDLE mode even when the other subscription is in a dedicated state, such as conducting a voice call.

Cellular telephone technologies include power management processes coordinated by a communication network base station (nodeB) that function so that the UEs' transmissions are received by the base station with about the same power level, which is a power level high enough to reliably receive the uplink signals, but not so high that UE batteries are drained unnecessarily or so high as to interference with other UEs communicating with the base station (i.e., the "near-far problem"). This requirement is very stringent in technologies that are interference limited, such as CDMA/WCDMA. Typically, the nodeB monitors the signal strength of signals received from each UE and frequently instructs each UE to increase or decrease its transmission power to maintain the received power in a desired band that minimizes interference with other users' uplink power control. In order to control a UE's transmission power, a nodeB compares the measured signal-to-interference ratio (SIR) of a UE's received signals and compares the measured SIR with a target SIR. If the measured SIR is less than the target SIR, the nodeB will request the UE to increase its power by sending a power up command. Otherwise, the nodeB may request the UE to decrease its power by sending a power down command.

This process functions very well for conventional cellphones, enabling the overall communication network, including the nodeB transmitters and the UEs, to optimize network bandwidth and power resources. However, a DSDS communication device with a single transceiver chain may behave in ways that can disrupt the conventional transmission power management process in a manner that can result in misallocation of network resources and unnecessary transmissions of power-up commands. This is because some DSDS communication devices manage network collisions by briefly pausing active subscription's transmissions and tuning the transceiver to another frequency to enable the other subscription to use the transceiver chain for its IDLE mode activities, followed by retuning the transceiver to the frequency of the active subscription. This process of briefly tuning the transceiver chain to support IDLE mode communications is referred to as a "tuneaway" routine. While tuneaway enables the non-active subscription to maintain a link to its network, the result is a brief gap in the transmissions of the active subscription, which is referred to herein as a "tuneaway gap." During a tuneaway gap in DSDS communication device transmissions, the nodeB will not receive replies to pages and may treat such reception gaps as evidence that the channel has degraded for that particular UE because the nodeB receives no indication when the UE tunes away. In response, the nodeB will send power up commands to the UE and increase its own transmission power on the affected channel as is the normal procedure when a channel degrades. If the channel has not degraded during the tuneaway gap (as will most often be the case), such power up commands are unnecessary. As a result, the UE may experience unnecessary battery drain when its transmission power is unnecessarily increased, and the nodeB may misallocate bandwidth resources to a channel that is not degraded, which can interfere with other UEs communicating with the nodeB. When the tuneaway is over and the UE resumes transmissions on the active subscription, the nodeB will note its signal strength and send power-down commands; however, the power-down process takes a while before the UE returns to the minimal power required for the current link.

SUMMARY

The various embodiments provide methods for configuring a communication network, and in particular a communication network base station (a nodeB) of a cellular telephone network, to recognize tuneaway events and to operate in a manner that mitigates the adverse effects of dual-SIM-dual-standby-communication-device ("UE") tuneaways on overall network capacity. In the various embodiments, the nodeB may detect when a UE is tuning away based on the periodic, characteristic nature of the drops in the UE's signal strength that occur during a tuneaway gap. When the nodeB recognizes that a UE is performing tuneaways, the nodeB may implement various resource management strategies during the UE's tuneaway gaps in order to appropriately manage network resources in such circumstances and resume normal resource management operations when the UE is not tuned away. Thus, the various embodiments enable the nodeB to recognize and manage network resources appropriately during a UE's tuneaway gaps, thereby increasing network capacity and optimizing power management.

In an embodiment, the nodeB may determine that the UE is tuning away after monitoring signal strength drops over a period of time. In a further embodiment, the nodeB may detect tuneaways of dual-SIM-dual-standby-communication-device UEs by analyzing each instance in which a UE's signal strength decreases below a power threshold to determine whether it is likely that the UE is periodically tuning away consistent with monitoring a second subscription. Based on the periodicity and power characteristics of multiple instances of power decreases over a given period of time (i.e., several determinations that power gaps are likely tuneaway gaps), the nodeB may determine that the UE is currently conducting tuneaway operations. The nodeB may also calculate the tuneaway frequency and tuneaway duration based on the observed pattern of power decreases.

In an embodiment, the nodeB may maintain a list of dual-SIM-dual-standby-communication-device UEs that the nodeB has determined are performing tuneaways. The nodeB may monitor UEs not included in the list for evidence of tuneaway gaps, such as regular, periodic decreases in signal power. When the nodeB determines that a dual-SIM-dual-standby-communication-device UE is performing tuneaways, the nodeB may include that UE in the list. In another embodiment, the nodeB may remove a dual-SIM-dual-standby-communication-device UE from the list when the nodeB detects changes in signal strength at unexpected times (e.g., drops in signal power at times other than the UE's expected tuneaway gap) or when the nodeB detects that the dual-SIM-dual-standby-communication-device UE has ceased or changed its tuneaway behavior.

In an embodiment, the nodeB may implement one or more resource management strategies during a dual-SIM-dual-standby-communication-device's tuneaway gaps to improve the UE's and the network's performance. Resource management strategies may include managing power levels for a dual-SIM-dual-standby-communication-device UE to avoid misallocation of network resources during the UE's tuneaway gaps, avoiding assignment of shared channels to the dual-SIM-dual-standby-communication-device UE during the UE's expected tuneaway gaps, and informing various schedulers for shared channels about the UE's expected tuneaway gap to ensure that the dual-SIM-dual-standby-communication-device UE may schedule as usual without penalty after the UE's tuneaway gaps end. Resource management strategies may also include scheduling other UEs or other communication devices to use the resources of a UE during the UE's expected tuneaway gaps. In another embodiment, the nodeB may resume normal resource management operations for the dual-SIM-dual-standby-communication-device UE after the UE's expected tuneaway gaps ends.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
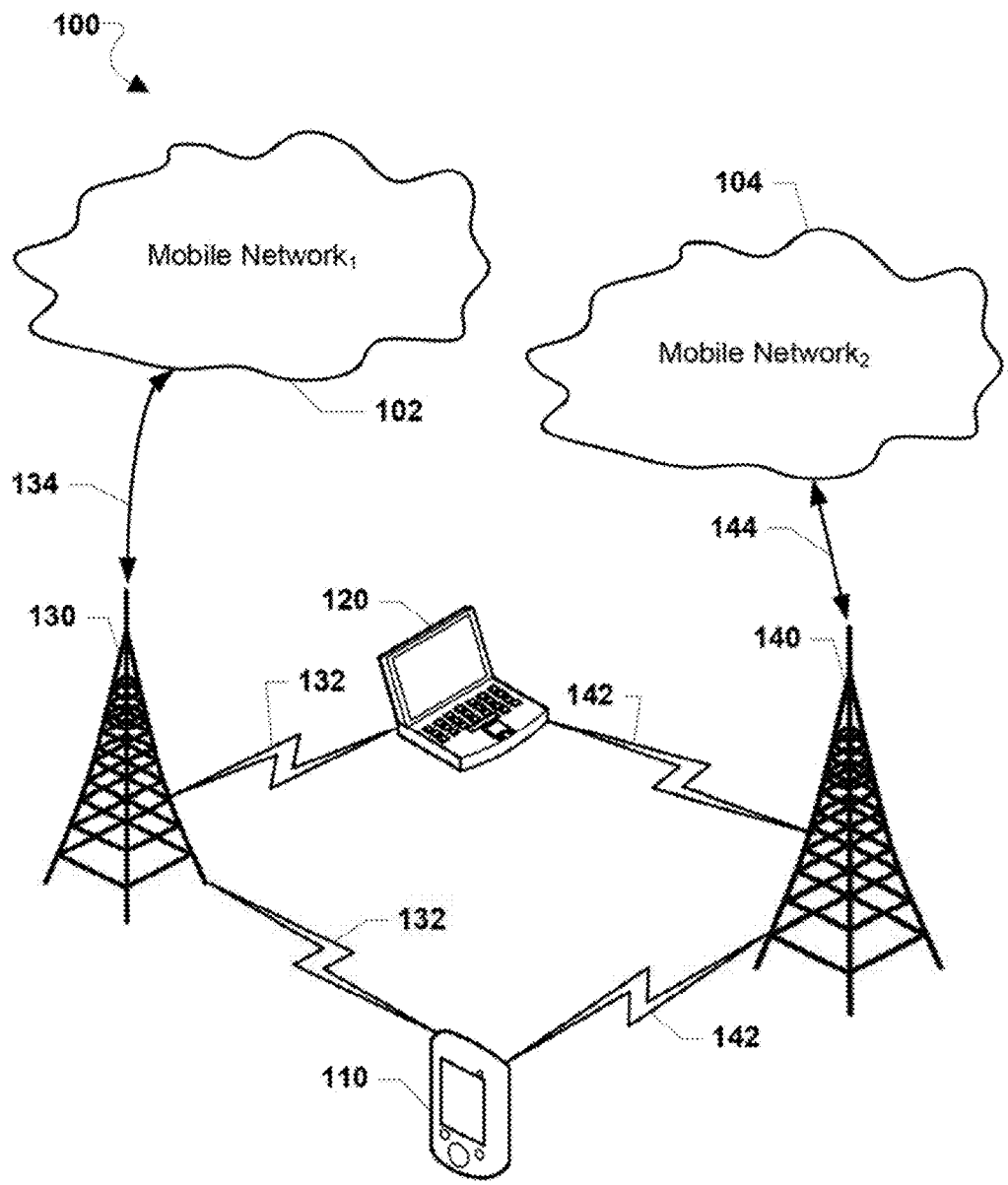
FIG. 1 is a communication system block diagram of mobile telephony networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "DSDS communication device" and "UE" are used interchangeably herein to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which individually include a programmable processor and memory and circuitry for connecting to at least two mobile communication networks. The embodiments may be useful in mobile communication networks that communicate with smart phones and similar mobile communication devices, and so such devices are referred to in the following descriptions. However, the embodiments may be useful for networks communicating with any communication devices that maintain two separate subscriptions to respective mobile networks through one radio transceivers (i.e., one shared RF resource).

In overview, the various embodiments provide methods for configuring a communication network, and in particular a nodeB of a cellular telephone network, to recognize tuneaway events and to operate in a manner that mitigates the adverse effects of dual-SIM-dual-standby-communication-device UE tuneaways on overall network capacity. In the various embodiments, the nodeB may detect when a UE is tuning away based on the periodic, characteristic nature of the drops in the UE's signal strength that occur during a tuneaway gap. When the nodeB recognizes that a UE is performing tuneaways, the nodeB may implement various resource management strategies during the UE's tuneaway gaps in order to appropriately manage network resources in such circumstances and resume normal resource management operations when the UE is not tuned away. Thus, the various embodiments enable the nodeB to recognize and manage network resources appropriately during a UE's tuneaway gaps, thereby increasing network capacity and optimizing power management.

In an embodiment, the nodeB may detect tuneaways of dual-SIM-dual-standby-communication-device UEs by analyzing each instance in which a UE's signal strength decreases below a power threshold to determine whether it is likely that the UE is periodically tuning away consistent with monitoring a second subscription. The nodeB may determine for each instance of power decrease whether the power decrease is likely due to a dual-SIM-dual-standby-communication-device UE tuning away. In another embodiment, the UE may determine that a power decrease is likely due to a UE tuning away based on the length of time that the UE's uplink signal strength is below the power threshold and based on how many downlink transmitter power-up requests the nodeB receives from the dual-SIM-dual-standby-communication-device UE for a certain time after the uplink signal strength returns to normal.

In another embodiment, the nodeB may determine that the UE is tuning away after monitoring signal strength drops over a period of time. For example, the nodeB may perform tuneaway detection for several seconds, during which time the nodeB may analyze the instances when the UE's transmitter power decreases below a threshold to determine whether the instances of power decrease have a periodic pattern consistent with tuneaway events. Based on the periodicity and power characteristics of multiple instances of power decreases over a given period of time (i.e., several determinations that power gaps are likely tuneaway gaps), the nodeB may determine that the UE is currently conducting tuneaway operations. The nodeB may also calculate the tuneaway frequency and tuneaway duration based on the observed pattern of power decreases.

In an embodiment, the nodeB may maintain a list of the UEs that the nodeB has determined are actively conducting tuneaways. The nodeB may maintain parameters for each dual-SIM-dual-standby-communication-device UE in the tuneaway list that describe the UE's tuneaway frequency (i.e., how often the UE tunes away, represented by the variable P) and the UE's tuneaway duration (i.e., how long each UE tunes away, represented by the variable D). Together, a UE's P and D values may define the UE's tuneaway pattern.

Since a dual-SIM-dual-standby-communication-device UE only performs tuneaways when two subscriptions are sharing a common transceiver chain, the UE may cease performing tuneaways whenever the operating modes of one or both subscriptions change such that network access collisions are not occurring (or not occurring frequently). To accommodate this, the nodeB may continue to monitor each UE for changes in its tuneaway pattern (e.g., a change in the tuneaway frequency/duration or the termination of tuning away) and may remove from the tuneaway list any UE that does not tune away at an anticipated time or otherwise departs from the previously observed tuneaway pattern. For example, if the nodeB does not lose the signal from a dual-SIM-dual-standby-communication-device UE when the next tuneaway is anticipated and/or loses the signal from a UE at a time other when the next tuneaway is anticipated, the nodeB may remove the dual-SIM-dual-standby-communication-device UE from the list and may begin managing power of the UE using the standard procedures (i.e., sending a power up command when the signal drops or is lost without consideration of a tune away). A dual-SIM-dual-standby-communication-device UE removed from the list will then be monitored by the nodeB like all other UEs and if the nodeB detects that its signal is again dropping according to a tuneaway pattern, it may place it back on the tuneaway list as discussed above.

Thus, the nodeB may only perform tuneaway management of those UE's currently exhibiting tuneaways and only so long as an observed periodic tuneaway pattern is maintained. Otherwise the nodeB may follow conventional processes for managing UE power levels and communication resources.

When the nodeB determines that a dual-SIM-dual-standby-communication-device UE is performing periodic tuneaways, it may change the way it manages power levels for that dual-SIM-dual-standby-communication-device UE to avoid misallocation of network resources during tuneaway gaps. In particular, when the nodeB anticipates that the dual-SIM-dual-standby-communication-device UE is about to tune away (based on the UE's tuneaway period) it may suspend power-up signaling for that UE for the expected tuneaway gap, effectively freezing the uplink signal strength for that UE for that duration. The nodeB may wait for the duration of the tuneaway gap plus an additional period of time for the UE's transmitter to warm up before resuming normal power management operations. By suspending power management processes for the UE while it is tuned away, the nodeB may avoid needless cycling of the UE power level as well as its own power allocation to the associated downlink channel.

The nodeB may also use the knowledge of the UE's expected tuneaway gaps to better manage wireless resources. In an embodiment, during the UE's expected tuneaway gap, the nodeB may not assign to the UE a shared channel, such as the high-speed physical downlink shared channel ("HS-PDCH"). In another embodiment, the nodeB may inform various schedulers for shared channels (e.g., the HS-PDCH scheduler) about the UE's expected tuneaway gap to ensure that the UE may schedule as usual after the tuneaway gap ends without penalty, thereby improving network capacity. In another embodiment, the nodeB may schedule other UEs to use the UE's resources during the UE's expected tuneaway gap. The nodeB may resume normal resource management operations after the UE's expected tuneaway gap ends.

The various embodiments may be implemented within a variety of wireless communication systems 100, such as cellular communication networks 102, 104 illustrated in FIG. 1. A first cellular communication network 102 and a second cellular communication network 104 typically include a plurality of cellular base stations (i.e., nodeBs 130, 140). A first DSDS communication device 110 may be in communication with a first cellular communication network 102 through a cellular connection 132 to a first nodeB 130, which may be in communication with the first cellular communication network 102 via a wired connection 134. The first DSDS communication device 110 may also be in communication with a second cellular communication network 104 through a cellular connection 142 to a second nodeB 140, which may be in communication with the second cellular communication network 104 through a wired connection 144.

A second DSDS communication device 120 may similarly communicate with the first cellular communication network 102 through a cellular connection 132 to a first nodeB 130. The second mobile communication device 120 may also communicate with the second cellular communication network 104 through a cellular connection 142 to the second nodeB 140. Cellular connections 132, 142 may be made through two-way wireless communication links, such as 4G, 3G, CDMA, TDMA, WCDMA, GSM, and other mobile telephony communication technologies.

Figure 2:
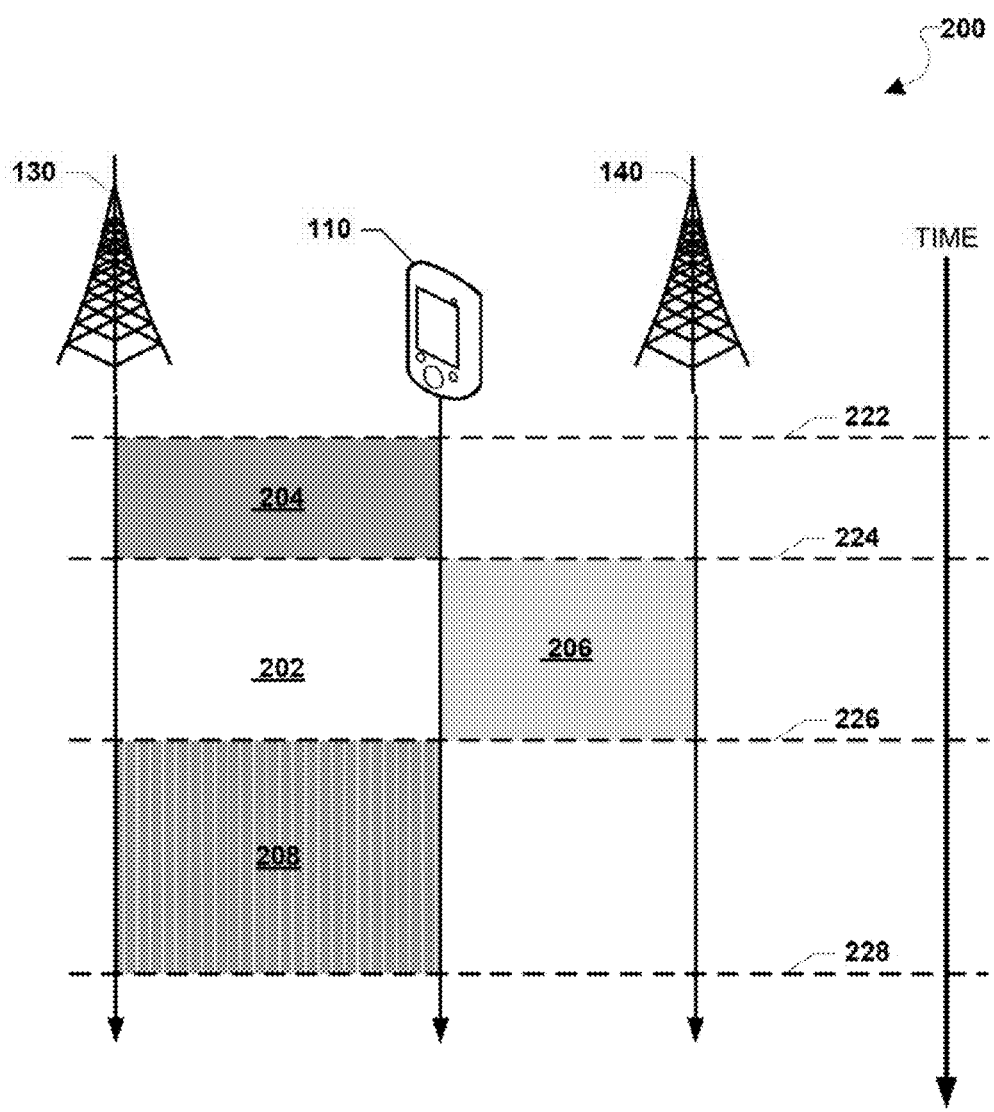
FIG. 2 is a time-line diagram illustrating a tuneaway routine.

FIG. 2 illustrates a timeline diagram 200 of a DSDS communication device 110 performing a tuneaway from a first nodeB 130 to a second nodeB 140. At time 222 the DSDS communication device 110 may establish an active connection between a first subscription (not shown) operating on the DSDS communication device and the first nodeB 130. For example, the first subscription may use the shared RF resource to connect with a first cellular communication network 102 through the first nodeB 130 to initiate a data or voice call that may last until time 228. The DSDS communication device 110 may maintain an active connection with the first nodeB 130 during a period 204 until the start of a tuneaway gap 202 at time 224.

At time 224, the DSDS communication device 110 may perform a tuneaway. In other words, a second subscription (not shown) operating on the DSDS communication device may receive the shared RF resource for communicating with the second subscription's cellular communication network 104 through a second nodeB 140 during a period 206. For example, the second subscription may perform paging communications with its cellular communication network 104 during the period 206.

During the period 206 in which the second subscription is using the shared RF resource, the first subscription may be in a tuneaway gap 202, during which the first subscription cannot communicate with the first nodeB 130. In various embodiments, such as the embodiments described with reference to FIGS. 7-8, the first nodeB 130 may have previously determined that the first subscription's silence is a result of a tuneaway instead of another cause (e.g., a reselection to another cell or moving away from the first nodeB 130).

Thus, during the tuneaway gap 202, the first nodeB 130, after previously determining that the DSDS communication device 110 is performing tuneaways, may implement various resource management strategies to effectively use/allocate the DSDS communication device's resources during the tuneaway gap 202. For example, the first nodeB 130 may reallocate the DSDS communication device 110's shared resources to other UEs. The tuneaway gap may last until a time 226, at which point the second subscription may have finished its communications during period 206 or the first subscription has otherwise received access to the shared RF resource. After detecting that the tuneaway gap 202 is over, the first nodeB 130 may resume allocating and managing the first subscription's resources as usual during period 208 until the first subscription's call ends at time 228.

Figure 3:
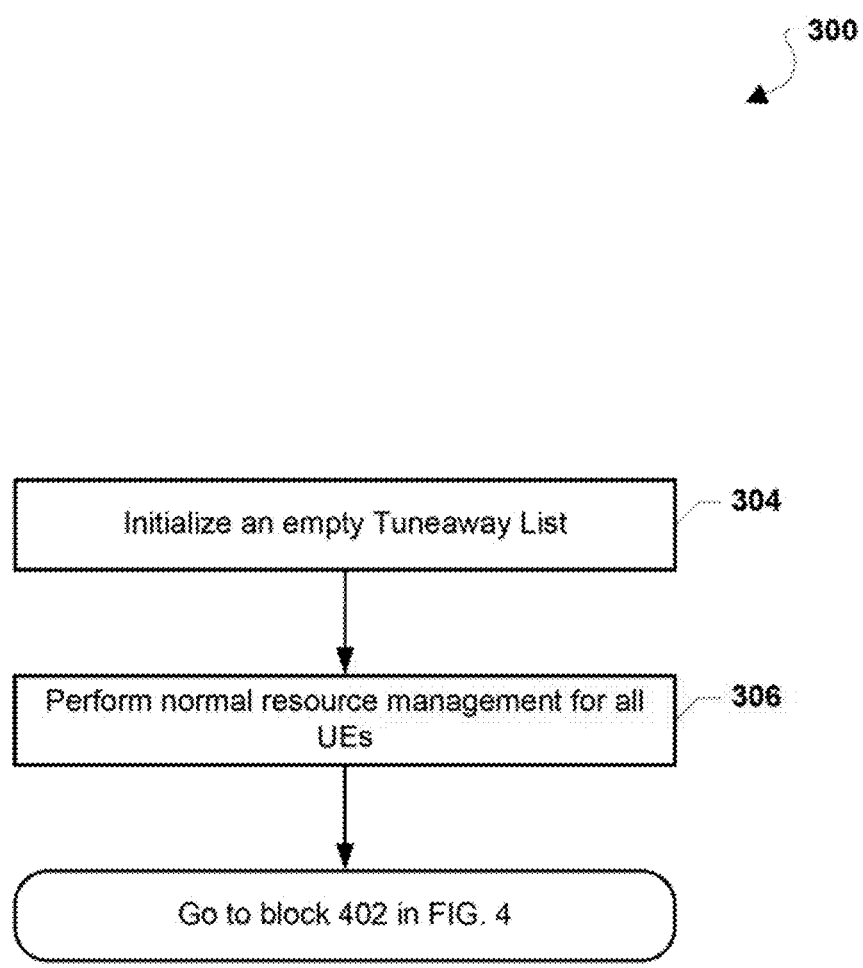
FIG. 3 is a process flow diagram illustrating an embodiment method for initializing a nodeB.

FIG. 3 illustrates an embodiment method 300 for preparing the nodeB to perform tuneaway detection. For ease of description, the various operations performed by the nodeB in the embodiment methods refer to operations related to a single UE. However, it should be clear that the nodeB may perform the same operations for any number of UEs with which it is maintaining communication links. For example, the nodeB may monitor a first UE while simultaneously performing tuneaway detection for a second UE, etc.

The nodeB may begin performing method 300 by initializing an empty tuneaway list in block 304. In an embodiment, a tuneaway list may be a list that includes the identities of UEs that the nodeB has determined perform tuneaways. The tuneaway list may also include various characteristics concerning the periodicity (P) and duration (D) of each UE's tuneaway gaps. In other words, the tuneaway list may list each UE that performs tuneaways and may also list when and how often those tuneaways occur. Thus, the nodeB may use the tuneaway list to keep track of the UEs that perform tuneaways and to predict when tuneaway gaps are expected to occur in the future. In another embodiment, the nodeB may implement a resource management strategy during those expected tuneaway gaps for the various UEs in the tuneaway list.

The nodeB may also perform normal resource management for all UEs in block 306. In an embodiment, the nodeB may perform normal resource management for any UE that is not included in the tuneaway list. However, as further described below with reference to FIG. 5, the nodeB may implement alternative resource management strategies for UEs in the tuneaway list. The nodeB may continue monitoring UEs not included in the tuneaway list for signs of tuneaway behavior in block 402 of method 400 described below with reference to FIG. 4.

Figure 4:
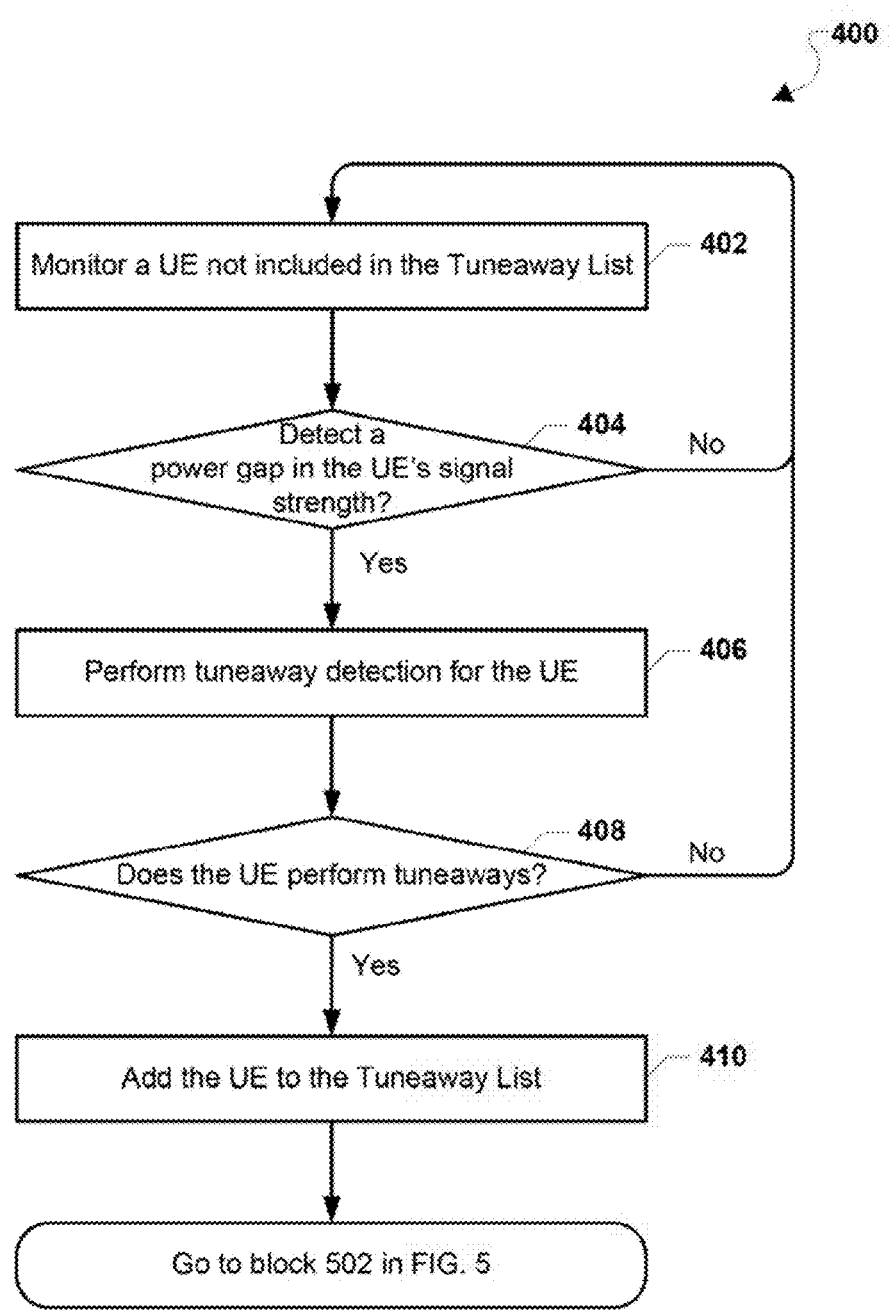
FIG. 4 is a process flow diagram illustrating an embodiment method for detecting whether a UE is performing tuneaways.

FIG. 4 illustrates an embodiment method 400 that may be implemented in a nodeB for determining whether a UE not already included in the tuneaway list is performing tuneaways. In block 402, the nodeB may monitor a UE not included in the tuneaway list. In determination block 404, the nodeB may determine whether a power gap in the UE's signal strength has been detected. In an embodiment, the nodeB may periodically send signals (e.g., power control signals) to the UE and may expect an acknowledgement signal (i.e., an ACK) from the UE. If the UE does not send an ACK to the nodeB, the nodeB may determine that the UE's receiver signal strength is too low to continue communications (i.e., that there is a power gap in the UE's signal strength).

If the nodeB does not detect a power gap in the UE's signal strength (i.e., determination block 404="No"), the nodeB may continue monitoring the UE in block 402. The nodeB may continue monitoring and checking for power gaps in the UE's signal strength indefinitely unless a power gap is detected.

When the nodeB detects a drop in the UE's signal strength (i.e., determination block 404="Yes"), the nodeB may perform tuneaway detection for the UE in block 406. In an embodiment, tuneaway detection may include performing various operations to determine whether the detected power gap is a tuneaway gap caused by the UE's performing tuneaways, rather than a power gap due to other causes, such as the UE's moving indoors or farther away from the nodeB. Tuneaway detection is discussed in more detail below with reference to FIGS. 6-8.

In determination block 408, the nodeB may determine whether the UE is performing tuneaways. If the nodeB determines that the UE is not performing tuneaways (i.e., determination block 408="No"), the nodeB may continue monitoring the UE in block 402 until the nodeB detects another power gap. If the nodeB determines that the UE is performing tuneaways (i.e., determination block 408="Yes"), the nodeB may add the UE to a tuneaway list that the nodeB maintains in memory. Adding a UE to the tuneaway list is discussed below with reference to FIG. 9. The nodeB may continue performing by determining a tuneaway pattern for a UE in the tuneaway list in block 502 of method 500 described below with reference to FIG. 5.

Figure 5:
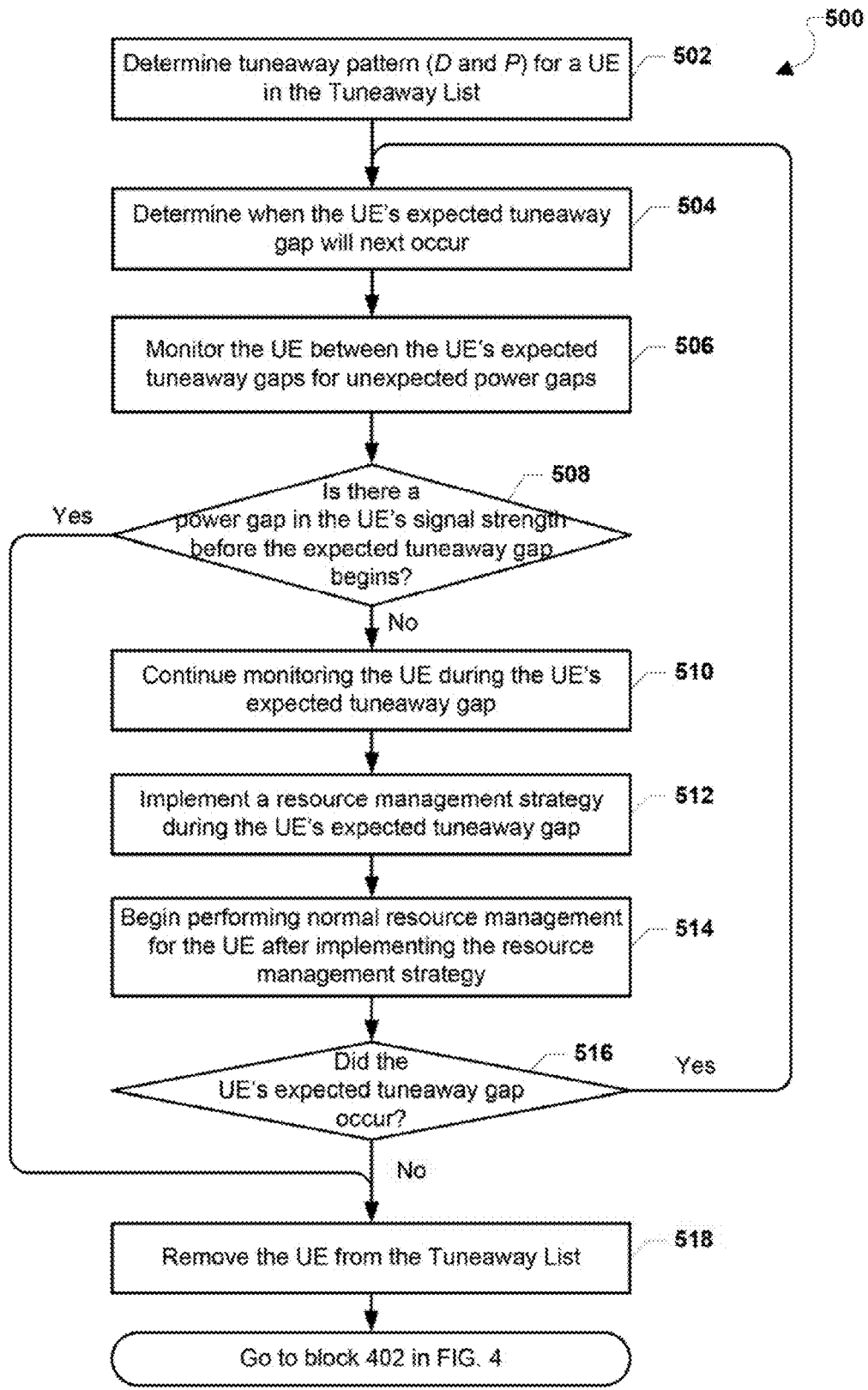
FIG. 5 is a process flow diagram illustrating an embodiment method for implementing a resource management strategy for a UE determined to perform tuneaways.

When an UE is added to the tuneaway list, the nodeB may begin implementing a resource management strategy for the UE during that UE's tuneaway gaps according to an embodiment method 500 illustrated FIG. 5. The nodeB may begin performing method 500 in block 502 by determining a tuneaway pattern for a UE in the tuneaway list. In an embodiment, a UE's tuneaway pattern may be defined by the UE's tuneaway gap duration (D) and period (P) values, which may be included in the tuneaway list and associated with that UE. In a further embodiment, the D and P values for a UE's tuneaway gap may be determined as part of the tuneaway detection process as described below with reference to FIG. 8.

The nodeB may also determine when the UE's expected tuneaway gap will next occur in block 504. In an embodiment, the nodeB may use the D and P values describing a UE's tuneaway gap to predict when the UE's next tuneaway gap will occur. For example, the nodeB may determine based on the UE's P value that the UE performs a tuneaway every 1.2 seconds and, based on the UE's D value, that the UE's tuneaway gap lasts 0.25 seconds. Based on the UE's P and D values, the nodeB may predict when the UE's expected tuneaway gap will next occur and how long the tuneaway gap will last.

In block 506, the nodeB may monitor the UE between the UE's expected tuneaway gaps for unexpected power gaps. For example, once the nodeB determines when the UE performs tuneaways, the nodeB may monitor the UE for unexpected decreases in the UE's signal strength (i.e., decreases occurring at times other than the predicted tuneaway gaps) that may indicate that the UE's power control may need to be adjusted due to actual deteriorated performance as opposed to just tuning away.

In determination block 508, the nodeB may determine whether there is a power gap in the UE's signal strength before the UE's next expected tuneaway gap begins. If the nodeB does detect a power gap at a time other than the expected tuneaway gap (i.e., determination block 508="Yes"), the nodeB may remove the UE from the tuneaway list in block 518. In an embodiment, the nodeB may keep the UE on the tuneaway list only as long as the UE's power gaps occur during its expected tuneaway gaps. Once the UE's signal strength behavior changes, the nodeB may revert to default power and/or resource management because the UE may no longer be tuning away, may have changed its tune away behavior, or may require typical power/resource management. Again, once a UE is removed from the tuneaway list, the nodeB may monitor it for tuneaway behavior in block 402 of method 400 described above with reference to FIG. 4.

So long as the nodeB does not detect a power gap at a time other than the expected tuneaway gap period (i.e., determination block 508="No"), the nodeB may continue monitoring the UE during the UE's expected tuneaway gap in block 510. In block 512, the nodeB may implement a resource management strategy during the UE's expected tuneaway gap. For example, the nodeB may cease transmitting to the UE during the tuneaway gap because the UE will not receive those transmissions. Various resource management strategy methods that may be implemented during expected tuneaway gaps are discussed below with reference to FIGS. 10-13.

The nodeB may return to normal resource management methods for the UE after implementing the resource management strategy in block 514. For example, if the nodeB reallocates the UE's resources to other UEs during the UE's tuneaway gap, the nodeB may return those resources to the UE when the tuneaway gap is over and may continue to perform normal or default resource management for the UE.

In determination block 516, the nodeB may determine whether the UE's expected tuneaway gap occurred. In an embodiment, the nodeB may monitor the UE during the UE's expected tuneaway gap as described with reference to block 510, and the nodeB may determine whether there was an expected drop in the UE's signal strength. If the UE's expected tuneaway gap occurred (i.e., determination block 516="Yes"), this confirms that the UE is likely still performing tuneaways so the nodeB may determine when the UE's next tuneaway gap will occur in block 504.

However, if the nodeB does not detect the expected drop in the UE's signal strength (i.e., determination block 516="No"), this indicates that the UE may have ceased performing tuneways or the UE's tuneaway pattern has changed, so the nodeB may remove the UE from the tuneaway list in block 518. If the UE is not performing tuneaways, then there is no need to implement resource management strategies for it, and if the periodicity of tuneaways has changed the nodeB may no longer be able to predict when the next UE tuneaway will occur. For either reason, the nodeB may return the UE to normal or default resource management by removing it from the tuneaway list and may monitor the UE for periodic drops in the UE's signal strength as described above with reference to FIG. 4.

Figure 6:
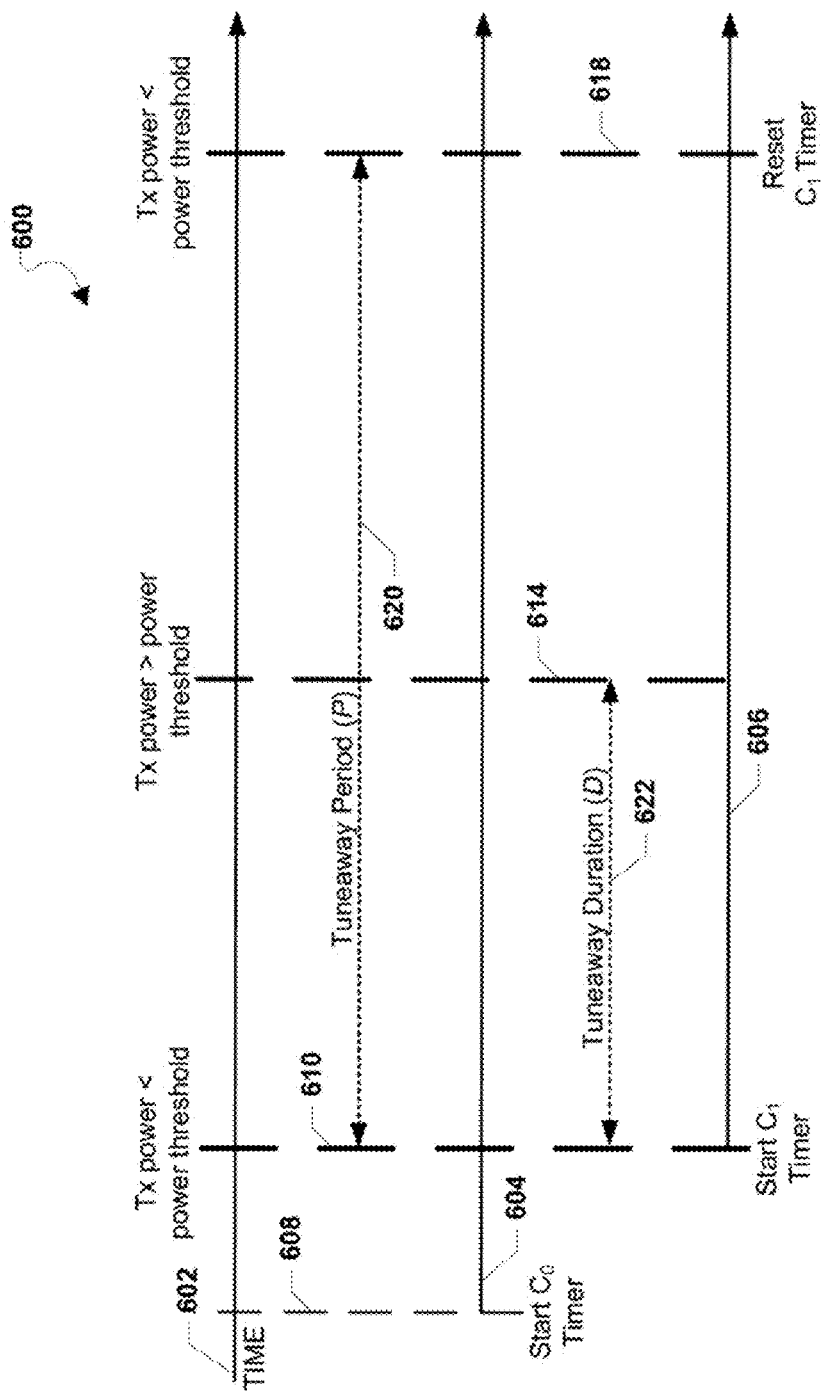
FIG. 6 is a timeline diagram illustrating a tuneaway gap according to an embodiment.

FIG. 6 illustrates a timeline diagram 600 of various events occurring during and characteristics of a tuneaway gap. Over time 602, a UE may periodically tuneaway from the nodeB without informing the nodeB beforehand. Thus, in an embodiment, the nodeB may maintain various timers and monitor several thresholds to determine whether the UE is performing tuneaways and the UE's tuneaway period 620 (P) and tuneaway duration 622 (D) for the UE's tuneaway gaps.

At time 608, the nodeB may start a first timer 604 ($C_0$). In an embodiment, the first timer 604 may serve as a point of reference for determining when subsequent events will occur. For example, after determining the tuneaway period 620, the nodeB may use the first timer 604 when determining the start time 618 of a subsequent tuneaway gap based on the start time 610 of an initial/prior tuneaway gap.

In an embodiment, the nodeB may monitor the UE's signal strength and compare the UE's signal strength to a power threshold. The nodeB may detect that the UE's signal strength drops below the threshold at time 610, which may indicate the beginning of a tuneaway gap. When the nodeB detects that the UE's signal has dropped below the power threshold, the nodeB may also start a second timer 606 ($C_1$).

In an embodiment, the nodeB may use the second timer to measure the duration of the UE's tuneaway gap. For instance, the nodeB may wait until the UE's signal strength exceeds the power threshold (i.e., until the tuneaway gap is over) and measure the second counter's value at that time 614. The nodeB may then determine the tuneaway duration 622 (i.e., how long the tuneaway gap lasted) based on the value of the second counter at the time 614 when the UE's signal power exceeded the power threshold.

In another embodiment, the nodeB may continue to let the second timer 606 run until the start time 618 of a subsequent tuneaway gap. Thus, the nodeB may determine the tuneaway period 620 (i.e., the duration from the start of a tuneaway gap until the start of the next tuneaway gap) based on the value of the second timer 606 at the time 618 when a subsequent tuneaway gap begins. The nodeB may also reset the second timer 606 after determining the tuneaway period 620 and repeat the process. Alternatively, such clocks may be used over a longer period of time spanning several tuneaway gaps, with the noted event times used to determine an average gap duration and periodicity.

Figure 7:
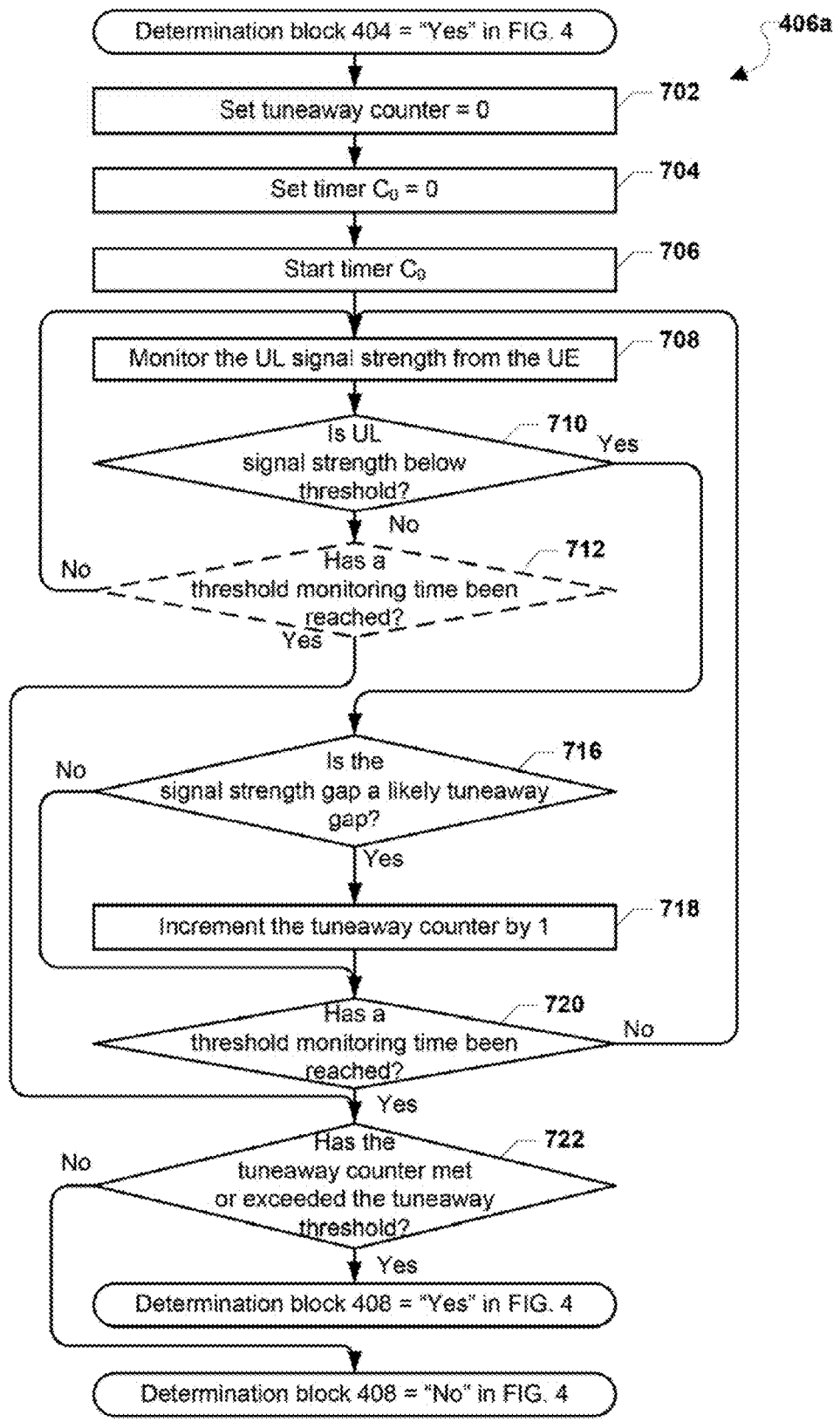
FIG. 7 is a process flow diagram illustrating an embodiment method for determining whether a UE is performing tuneaways.

FIG. 7 illustrates an embodiment method 406a that may be implemented in a nodeB for determining whether a UE is performing tuneaways. The operations of method 406a implement an embodiment of the operations of block 406 of method 400 described above with reference to FIG. 4. In method 406a, when the nodeB detects a power gap in the UE's signal strength (i.e., determination block 404 in FIG. 4="Yes"), the nodeB may set a tuneaway counter equal to zero in block 702. In an embodiment, the nodeB may use the tuneaway counter as a measure of the number of times the nodeB determines that a power gap is a likely tuneaway gap.

The nodeB may also set a timer $C_0$ equal to zero in block 704. As discussed above with reference to FIG. 6, the nodeB may use the timer $C_0$ when determining when a future tuneaway gap may occur. The nodeB may also start the timer $C_0$ in block 706.

In block 708, the nodeB may monitor the uplink (UL) signal strength from the UE. In an embodiment, the nodeB may monitor the UE for power gaps that may be a tuneaway gap. The nodeB may determine in determination block 710 whether the uplink signal strength of the UE is below a certain power threshold. In other words, the nodeB may determine that it has detected a power gap.

If the nodeB detects that the UE is not in a power gap (i.e., determination block 710="No"), the nodeB may continue to monitor the UE's uplink signal strength in block 708. In a further embodiment, the nodeB may optionally determine in optional determination block 712 whether a threshold monitoring time has been reached. In this embodiment, the nodeB may only monitor the UE's signal strength for a certain period of time. For example, if the nodeB has monitored the UE for an extended period of time without detecting a power gap, the nodeB may not need to monitor the UE further to determine that the UE is not performing tuneaways. As such, if the timeout threshold has not been reached (i.e., optional determination block 712="No"), the nodeB may continue to monitor the UE's uplink signal strength in block 708. But if the timeout threshold has been reached (i.e., optional determination block 712="Yes"), the nodeB may by determine whether the tuneaway counter has met or exceed a tuneaway threshold for the UE in determination block 722.

If the nodeB detects that the UE's signal strength is below a threshold (i.e., determination block 710="Yes"), the nodeB may determine whether the UE's signal strength gap is likely a tuneaway gap in determination block 716. In an embodiment, the nodeB may perform various timing measurements of patterns in the UE's signal strength to determine whether the power gaps detected have characteristics of tuneaways, including evidence of a predictable, periodic drop in signal power. The process of determining whether the signal strength drops are likely due to tuneaways is described in further detail below with reference to FIG. 8.

If the nodeB does determine that the signal strength gap is not likely a tuneaway gap (i.e., determination block 716="No"), the nodeB may determine whether a threshold monitoring time has been reached in determination block 720. For example, the nodeB may determine that the signal strength gap is not likely a tuneaway gap because the duration of the signal strength gap was too short to likely be a tuneaway gap. If the nodeB determines that the signal strength gap is likely a tuneaway gap (i.e., determination block 716="Yes"), the nodeB may increment the tuneaway counter by 1 in block 718. In an embodiment, over a certain amount of time, the nodeB may keep track of the number of power gaps determined to be likely tuneaway gaps using the tuneaway counter.

In determination block 720, the nodeB may determine whether a monitoring time threshold has been reached. In an embodiment, the nodeB may only monitor the UE for a certain amount of time, during which the nodeB may attempt to determine whether detected power gaps are likely tuneaway gaps. In another embodiment, the monitoring time threshold may be a period of time long enough for the nodeB to monitor the UE for several DRX cycles for an arbitrary radio access technology (e.g., GSM, CDMA/WCDMA, etc.). If the nodeB has not monitored the UE for a long enough time to determine whether the UE is performing tuneaways (i.e., determination block 720="No"), the nodeB may continue operating in block 708 by continuing to monitor the signal strength of the UE.

If the nodeB has monitored the UE for a long enough time to determine whether the UE is performing tuneaways (i.e., determination block 720="Yes"), the nodeB may determine whether the tuneaway counter has met or exceeded a tuneaway threshold in determination block 722. In an embodiment, the tuneaway threshold may be a number that imposes a confidence requirement before the nodeB determines that a UE is performing tuneaways. In other words, for a given period of time (i.e., the monitoring time threshold), the nodeB must have determined that a certain number of power gaps occurred and that a certain number of those power gaps were likely tuneaway gaps. In another embodiment, the tuneaway threshold may be based on the expected number of power gaps that the nodeB expects to occur during the monitoring time threshold or various other metrics.

If the nodeB determines that the tuneaway counter has met or exceeded the tuneaway threshold (i.e., determination block 722="Yes"), the nodeB may add the UE to the tuneaway list in block 410 as described above with reference to FIG. 4 when determination block 408="Yes." Otherwise, (i.e., determination block 722="No"), the nodeB may continue monitoring the UE like all UEs not on the tuneaway list in block 402 as described above with reference to FIG. 4 when determination block 408="No."

Figure 8:
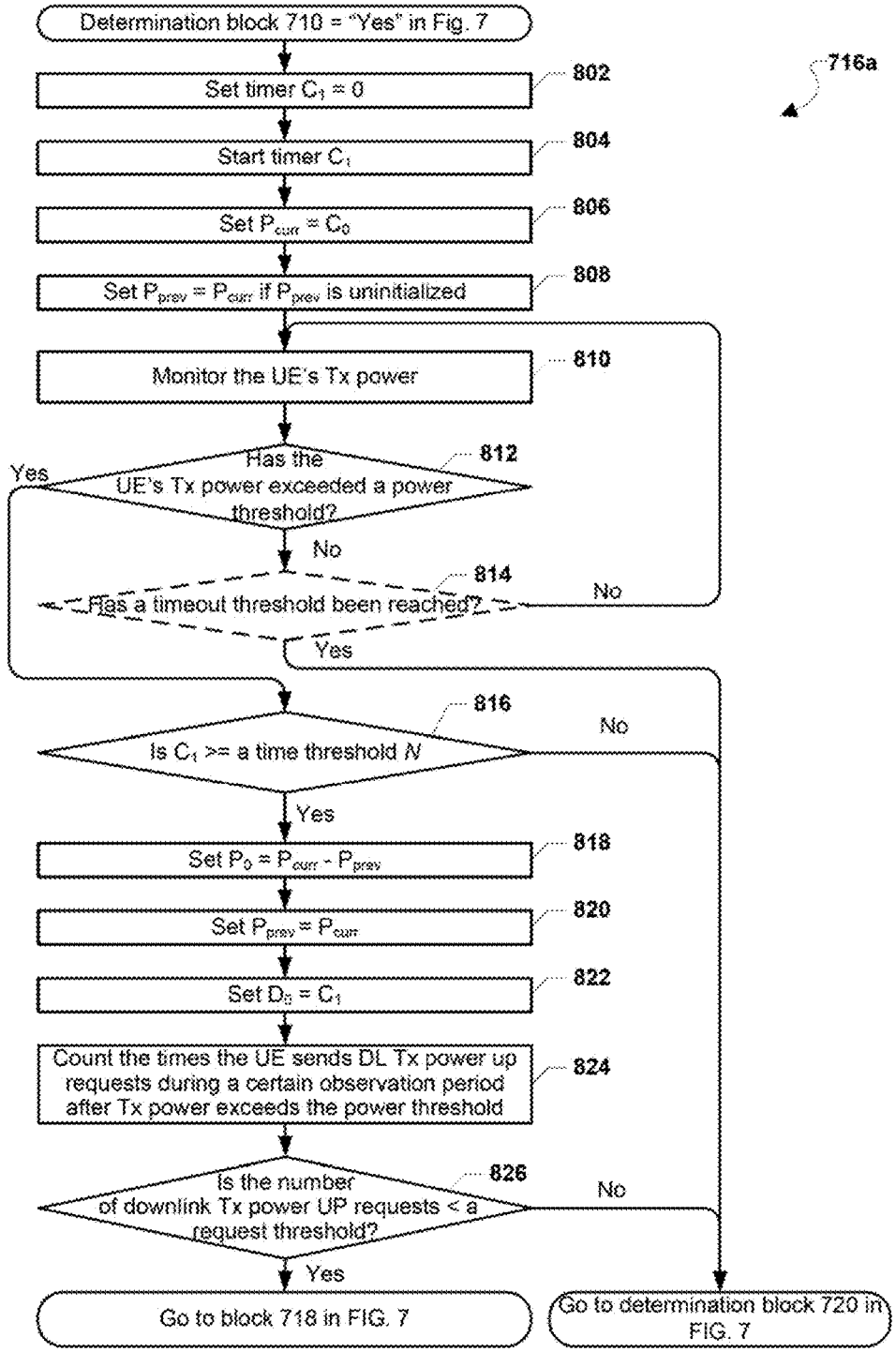
FIG. 8 is a process flow diagram illustrating an embodiment method for determining whether a decrease is Rx signal strength is likely a tuneaway gap.

FIG. 8 illustrates an embodiment nodeB method 716a for determining whether a signal strength gap is likely a tuneaway gap. Embodiment method 716a may be implemented when the nodeB detects that the UE's signal strength is below a threshold as described above with reference to FIG. 7 (i.e., determination block 710="Yes"). In block 802, the nodeB may set a second timer $C_1$ equal to zero. As discussed above with reference to FIG. 6, the nodeB may use the $C_1$ timer when measuring the periodicity (i.e., P value) and duration (D value) for a tuneaway period. The nodeB may start timer $C_1$ in block 804.

In block 806, the nodeB may set an indication of the start of a current tuneaway gap (i.e., $P_{curr}$) equal to the value of the first timer $C_0$. As discussed above with reference to block 704 in FIG. 7, the nodeB may use the first timer $C_0$ when keeping track of the beginning and end of multiple suspected tuneaway gaps. Thus, in an embodiment, $P_{curr}$ may be assigned the value of the first timer $C_0$ at the beginning of a new suspected tuneaway gap in block 806. Also, in block 808, the nodeB may set an indication of the start of the last previous suspected tuneaway gap (i.e., $P_{prev}$) equal to the beginning of the current suspected tuneaway gap. In an embodiment, $P_{prev}$ may equal $P_{curr}$ for the first suspected tuneaway gap the nodeB detects because there is no recorded previous tuneaway gap.

In block 810, the nodeB may monitor the UE's transmitter (Tx) power. In determination block 812, the nodeB may determine whether the UE's Tx power has exceeded a power threshold. In an embodiment, the nodeB may determine that the UE has come out of a power gap when the UE's Tx power exceeds the power threshold.

If the UE has not come out of the power gap (i.e., determination block 812="No"), the nodeB may optionally determine whether a timeout threshold has been reached in optional determination block 814. In an embodiment, the nodeB may only monitor the UE's Tx power for a given period of time. For example, if the UE has reselected to a different cell or has powered down, the UE's Tx power may not exceed the power threshold for a very long time, and the nodeB may not need to wait that long to determine that the power gap is not likely a tuneaway gap. Thus, in another embodiment, the timeout threshold may represent a period of time that the nodeB expects the UE's Tx power to exceed the power threshold when the UE is performing tuneaways. If the UE's Tx power does not exceed the power threshold within that time (i.e., optional determination block 814="Yes"), the nodeB may safely conclude that the power gap is not likely a tuneaway gap and continue operating in determination block 720 in FIG. 7. If the UE's Tx power does exceed the power threshold within that time (i.e., optional determination block 814="No"), the nodeB may continue monitoring the UE's Tx power in block 810.

If the UE's Tx power has exceeded a power threshold (i.e., determination block 812="Yes"), the nodeB may determine whether the second timer $C_1$ is greater than or equal to a time threshold N in determination block 816. In an embodiment, the time threshold N may be the least amount of time that the nodeB expects a tuneaway gap to last. In a further embodiment, the nodeB may base the time threshold N on a known or measured minimum time for DRX cycles. For example, the nodeB may set the time threshold N to 0.25 second because the shortest DRX cycle length for various radio access technologies is 0.25. If the value of the second timer $C_1$ is less than the time threshold N (i.e., determination block 816="No"), the nodeB may conclude that the power gap is not likely a tuneaway gap because the power gap is too brief and may continue operating in determination block 720 in FIG. 7.

If the value of the second timer $C_1$ is not less than the time threshold N (i.e., determination block 816="Yes"), in block 818, the nodeB may set the UE's periodicity value (i.e., P value) equal to the difference of start time of the current power gap and the start time of the previous power gap (i.e., $P_0=P_{curr}-P_{prev}$). In block 820, the nodeB may also set the start time of the previous power gap (i.e., $P_{prev}$) equal to the start time of the current power gap (i.e., $P_{curr}$). In an embodiment, the nodeB may set $P_{prev}$ equal to $P_{curr}$ to later determine the P value for the next power gap.

In block 822, the nodeB may also set the power gap duration (i.e., D value) equal to the current value of the second timer $C_1$ (i.e., $D_0=C_1$). As discussed above with reference to FIG. 6, the second timer $C_1$ may measure the duration of the power gap (i.e., from when the nodeB detects the beginning of the power gap until the UE's Tx power exceeds the power threshold).

In block 824, the nodeB may count the number of times the UE sends a downlink Tx power up request to the nodeB during a certain observation period after the UE's Tx power exceeds the power threshold. In an embodiment, a UE performing tuneaways may not send downlink Tx power up requests after exiting a tuneaway gap, whereas a UE experiencing a real power gap may send numerous requests to the nodeB to increase the nodeB's power.

In determination block 826, the nodeB may determine whether the number of downlink Tx power up requests received is less than a request threshold. In an embodiment, the request threshold may be a measure of the minimum number of power up requests the nodeB expects when a UE experiences a genuine power gap. In other words, the nodeB may determine that a UE that does not request a certain number of power up requests may likely be exiting a tuneaway gap instead of another kind of power gap.

If the nodeB determines that the number of downlink Tx power up requests from the UE is less than the request threshold (i.e., determination block 826="Yes"), the nodeB may continue performing in block 718 in FIG. 7 by incrementing the tuneaway counter by one. In other words, the nodeB may determine that the power gap is likely a tuneaway gap. If the nodeB determines that the number of downlink Tx power up requests from the UE is equal to or greater than the request threshold (i.e., determination block 826="No"), the nodeB may determine whether a threshold monitoring time has been reached in determination block 720 in method 700 described above with reference to FIG. 7.

Figure 9:
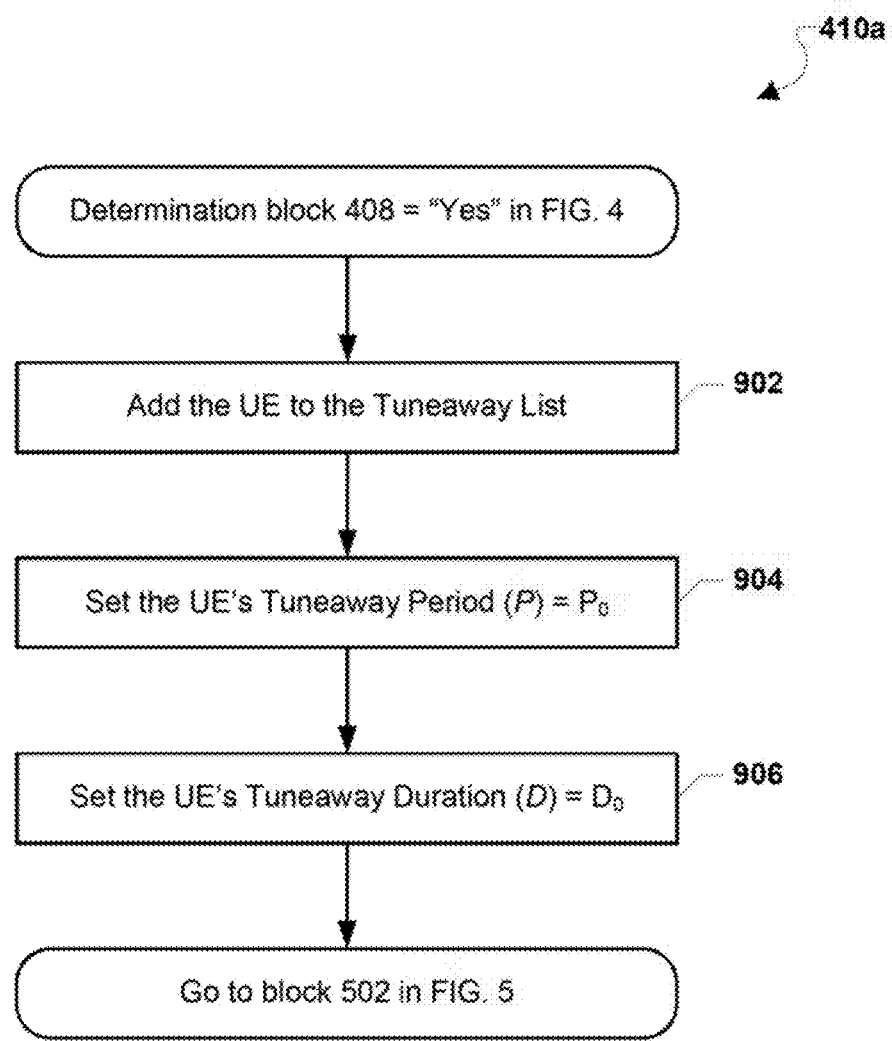
FIG. 9 is a process flow diagram illustrating an embodiment method for adding a UE to a tuneaway list.

FIG. 9 illustrates an embodiment nodeB method 410a for adding a UE to the tuneaway list. In an embodiment, the steps of method 410a may correspond with the operations the nodeB performs in block 410 in FIG. 4. The nodeB may begin performing method 410a after determining that the UE is performing tuneaways (i.e., determination block 408="Yes"). In block 902, the nodeB may add the UE to the tuneaway list. In block 904, the nodeB may set the UE's tuneaway period (i.e., P value) equal to the measured value of the UE's tuneaway period (i.e., $P_0$). In an embodiment, the nodeB may determine $P_0$ by measuring the start time for one tuneaway gap to the start time for the next tuneaway gap as described above with reference to FIG. 8 (i.e., $P_0=P_{curr}-P_{prev}$). In another embodiment (not shown), the UE's P value may be set to the average of multiple measured values for $P_0$.

Similarly, the nodeB may set the UE's tuneaway duration (i.e., D value) equal to the measured value for the UE's tuneaway duration (i.e., $D_0$) in block 906. As described above with reference to FIG. 7, the nodeB may determine the UE's D value by using a second timer $C_1$ to measure the beginning of the tuneaway gap until the UE exits the tuneaway gap. In another embodiment (not shown), the UE's D value may be set to the average of multiple measured values for $D_0$. The nodeB may then determine the tuneaway pattern (D value and P value) for the UE as described above with reference to block 502 in FIG. 5.

FIGS. 10-13 illustrate embodiment methods for implementing a resource management strategy in a nodeB during a UE's tuneaway gaps. The methods illustrated in FIGS. 10-13 may be performed individually or in combination. In various embodiments, the nodeB may also have previously determined when a UE performs tuneaways and may implement various resource management strategies during such times.

Figure 10:
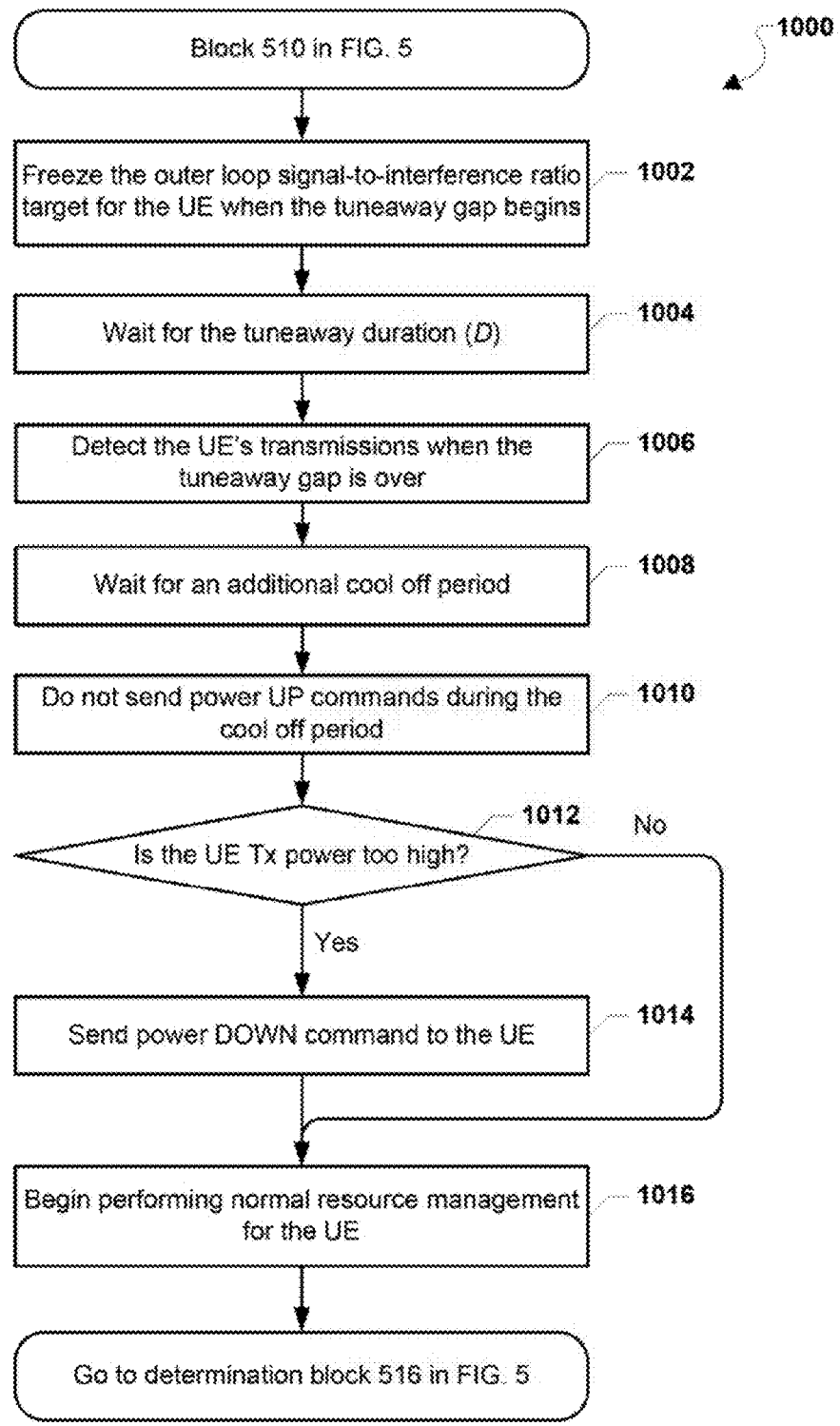
FIGS. 10-13 are process flow diagrams illustrating embodiment methods for implementing a resource management strategy during UE tuneaway gaps.

FIG. 10 illustrates an embodiment nodeB method 1000 that may be implemented once a UE's tuneaway pattern is determined (as described above with reference to FIG. 5) for preventing the UE's Tx surge at the end of the UE's tuneaway gap. In block 1002, the nodeB may freeze the outer loop signal-to-interference ratio target for the UE when the tuneaway gap begins. The nodeB may also wait for the UE's tuneaway duration value (i.e., D value) in block 1004. In other words, the nodeB may ignore the UE during the tuneaway gap (i.e., wait the entire duration of the UE's expected tuneaway gap) because the UE is performing a tuneaway and is not experiencing another kind of power gap that may require remedial action.

In block 1006, the nodeB may detect the UE's transmission when the tuneaway gap is over. The nodeB may also wait an additional cool off period in block 1008. In an embodiment, the cool off period may be an amount of time required for the UE to return to a normal Tx power after the tuneaway. During this the cool off period, the nodeB may not send power up commands to the UE. In other words, the nodeB may wait until the UE has returned to normal operations and normal Tx powers before accessing whether the UE's power levels are too high or too low. By waiting until the UE resumes normal operations (i.e., waiting for a cool-off period) before resuming power up command, the nodeB may prevent the UE from transmitting at a higher power than necessary and may, therefore, prevent the UE from causing interferences to other UEs.

In determination block 1012, the nodeB may determine whether the UE's Tx power is too high. In an embodiment, the nodeB may monitor the UE's Tx power after the cool-off period and check whether the UE's Tx power exceeds an optimal level. If the UE's Tx power is too high (i.e., determination block 1012="Yes"), the nodeB may send a power down command to the UE in block 1014. By requiring the UE to decrease its Tx power, the nodeB may reduce interference from the UE. For example, in a WCDMA system when the UE is in a soft hand-off, a power down command from the nodeB may prevent the UE from causing interference to up to five other nodeBs. The nodeB may continue operating in block 514.

If the UE's Tx power is not too high (i.e., determination block 1012="No"), the nodeB may begin performing normal resource management for the UE in block 1016. In an embodiment, the nodeB may begin to manage the UE as usual until the UE's next tuneaway gap. The nodeB may continue operating by determining whether the tuneaway gap occurred as expected in determination block 516 described above with reference to FIG. 5.

Figure 11:
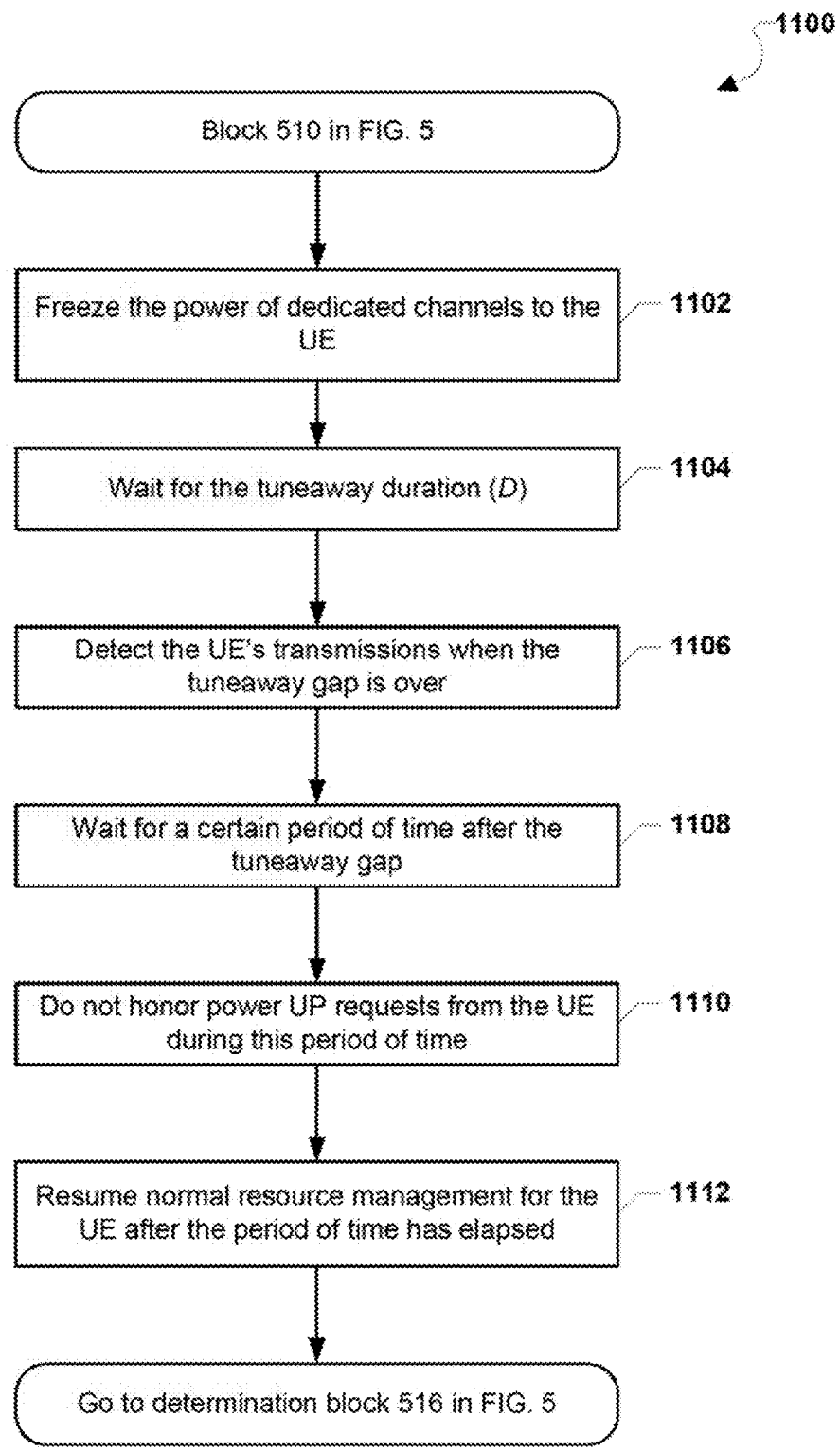

FIG. 11 illustrates another embodiment nodeB method 1100 for implementing a resource management strategy for a UE during a tuneaway gap once a UE's tuneaway pattern is determined (as described above with reference to FIG. 5).

In block 1102, the nodeB may freeze the power of dedicated channels to the UE. The nodeB may also wait for the UE's tuneaway duration in block 1104. In other words, the nodeB may eliminate the effects of the UE's tuneaway by maintaining the UE's dedicated channels' power during the tuneaway gap instead of changing the power levels unnecessarily.

In block 1106, the nodeB may detect the UE's transmission when the tuneaway gap is over. The nodeB may also wait for a certain period of time after the tuneaway gap in block 1108. During this period of time, the nodeB may not honor power up requests from the UE in block 1110. In other words, the nodeB may wait for the UE to return to perform RF warm-ups and other activities after returning from tuning away. By waiting for the UE to stabilize after tuning away, the nodeB may avoid undue interference from the UE that may affect other UEs in the downlink channel.

In block 1112, the nodeB may resume normal resource management for the UE after the period of time has elapsed. In an embodiment, the nodeB may perform normal resource management for the UE until the UE's next tuneaway gap. The nodeB may return to determination block 516 in method 500 described above with reference to FIG. 5.

Figure 12:
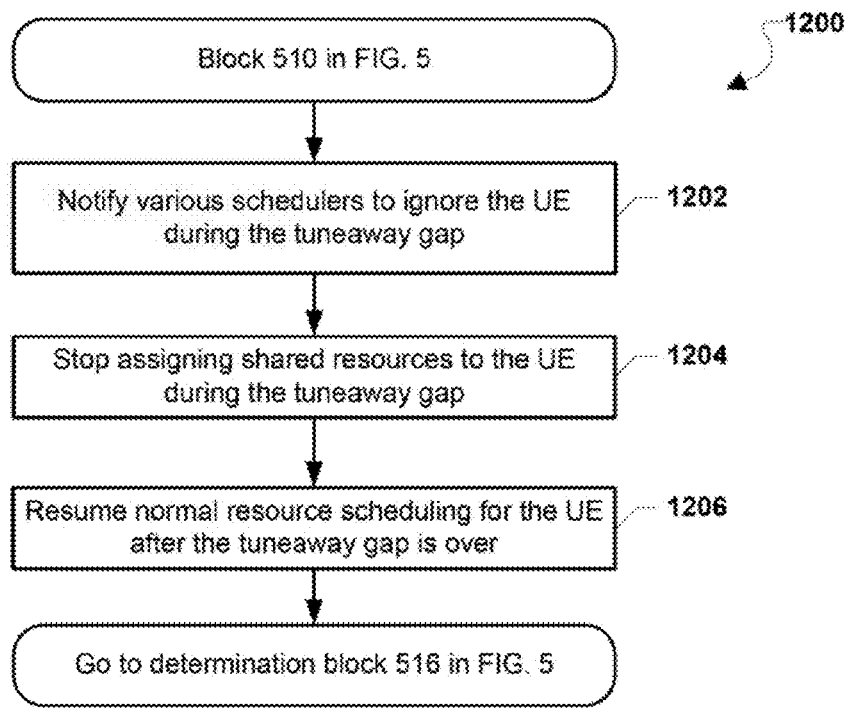

FIG. 12 illustrates another embodiment nodeB method 1200 for reallocating the UE's resources during the UE's tuneaway gap once a UE's tuneaway pattern is determined (as described above with reference to FIG. 5).

In block 1202, the nodeB may notify various schedules to ignore the UE during the tuneaway gap. In an embodiment, by notifying the schedulers of the UE's tuneaway gap, the nodeB may enable the schedulers to anticipate the UE's tuneaway gap. For example, the nodeB may inform the high-speed downlink packet access (HSDPA) schedule about the UE's tune away so that the HSDPA scheduler can anticipate the end of the UE's expected tuneaway gap, thereby preventing the UE from being penalized after tuning away.

In block 1204, the nodeB may stop assigning shared resources to the UE during the UE's expected tuneaway gap. In an embodiment, because the UE cannot otherwise utilize shared resources while in the tuneaway gap, the nodeB may not provide any shared resources to the UE during the UE's expected tuneaway gap. Thus, by rescheduling and/or reallocating resources during the UE's expected tuneaway gap, the nodeB may improve overall network capacity.

In block 1206, the nodeB may resume normal resource scheduling and allocation for the UE after the tuneaway gap is over. For example, the nodeB may alert various schedulers that the UE is no longer tuning away. The nodeB may return to determination block 516 in method 500 described above with reference to FIG. 5.

Figure 13:
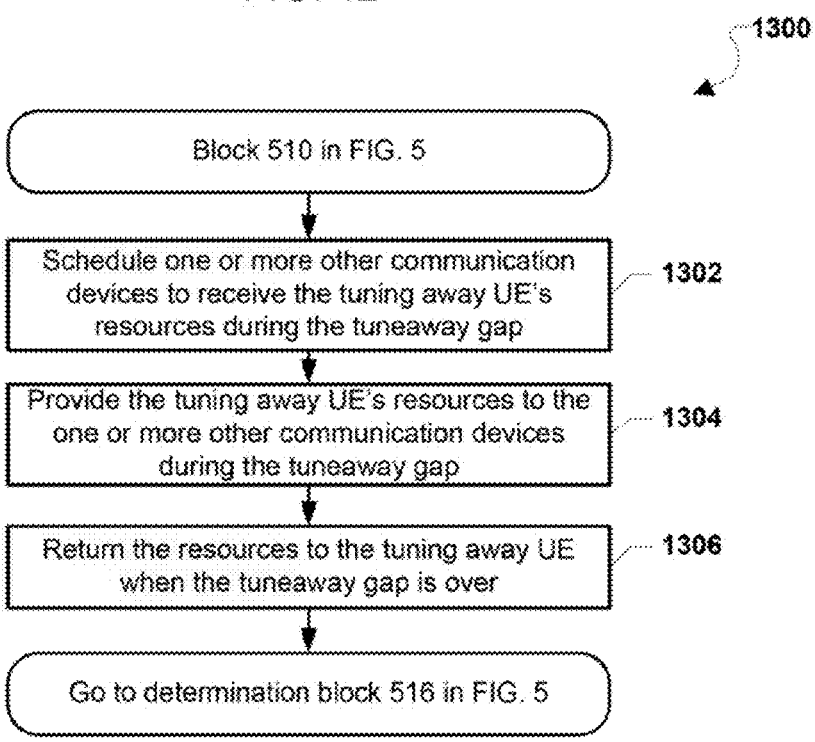

FIG. 13 illustrates yet another embodiment nodeB method 1300 for implementing a resource management strategy during the UE's tuneaway gap once a UE's tuneaway pattern is determined (as described above with reference to FIG. 5).

In block 1302, the nodeB may schedule at least one other communication device to receive the UE's resources during the UE's expected tuneaway gap. In block 1304, the nodeB may provide the UE's resources to the at least one other communication device during the tuneaway gap. In the various embodiments, the nodeB may reallocate resources to at least one other communication device during the UE's expected tuneaway gap because the UE is unable to communicate with the nodeB during the tuneaway gap and, thus, any resources assigned to the UE would be wasted. In an embodiment, the at least one other communication device may be any communication device in communication with the nodeB, such as another DSDS communication device or a more conventional communication device (e.g., a smartphone with only one SIM/subscription).

In block 1306, the nodeB may return the resources to the UE when the UE's tuneaway gap is over. In other words, the nodeB may resume performing normal resource management for the UE when the UE is not in a tuneaway gap. The nodeB may return to determination block 516 in method 500 described above with reference to FIG. 5.

Figure 14:
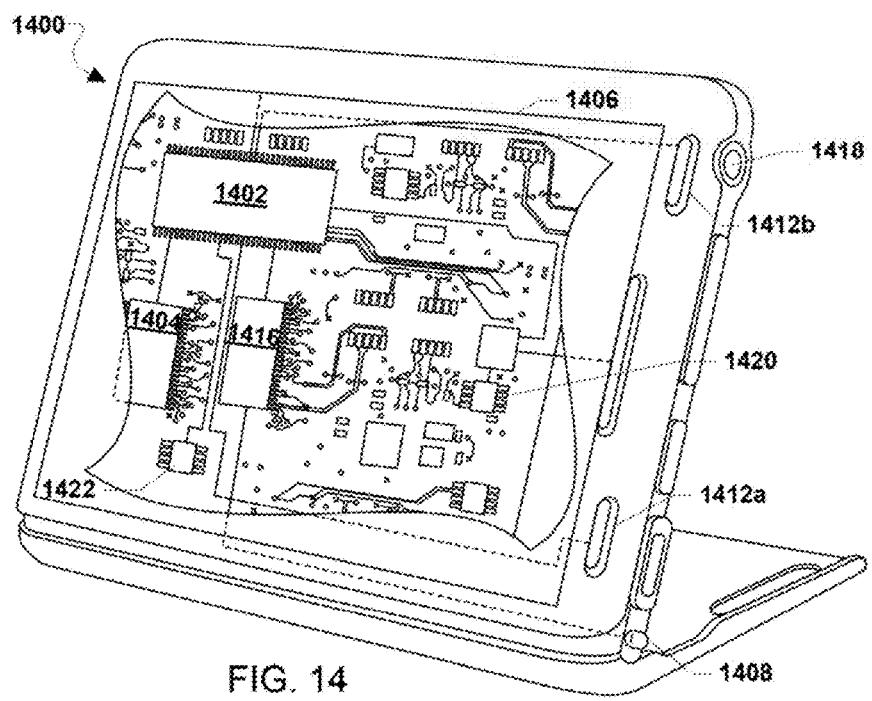
FIG. 14 is a block diagram of an example DSDS communication device suitable for use with the various embodiments.

FIG. 14 illustrates an example DSDS communication device 1400 suitable for use in the various embodiments described above. The mobile communication device 1400 may include a processor 1402 coupled to internal memory 1404. Internal memory 1404 may be volatile or non-volatile memory, and may also be secure and/or encrypted memory, or unsecure and/or unencrypted memory, or any combination thereof. The processor 1402 may also be coupled to a touch screen display 1406, such as a resistive-sensing touch screen, capacitive-sensing touch screen infrared sensing touch screen, or the like. Additionally, the display of the mobile communication device 1400 need not have touch screen capability. Additionally, the mobile communication device 1400 may have one or more antenna 1408 for sending and receiving electromagnetic radiation that may be connected to a wireless data link and/or cellular telephone transceiver 1416 coupled to the processor 1402. The mobile communication device 1400 may also include physical buttons 1412a and 1412b for receiving user inputs. The mobile communication device 1400 may also include a power button 1418 for turning the mobile communication device 1400 on and off. The mobile communication device 1400 may have a first SIM card 1420 and a second SIM card 1422 that utilize a cellular telephone transceiver 1416 and one or more antennae 1408 to connect to a first and a second mobile network, respectively.

Figure 15:
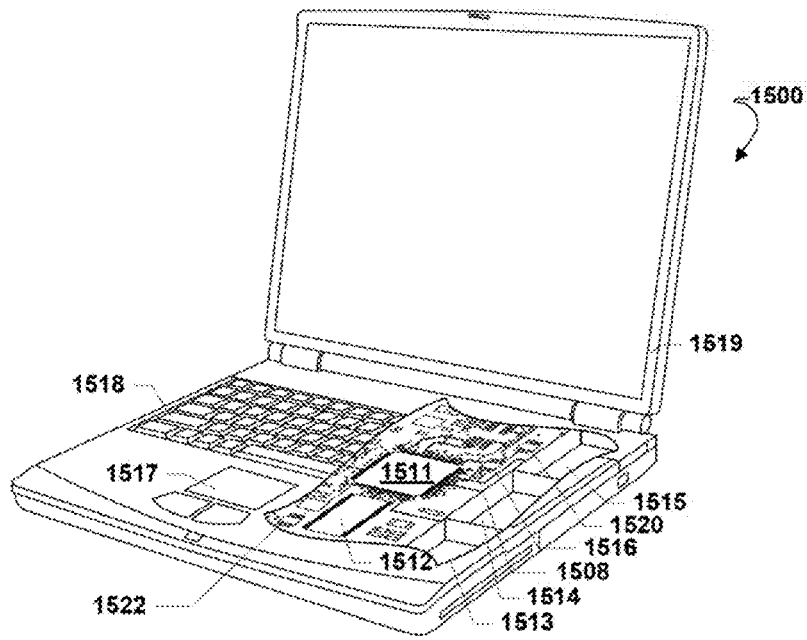
FIG. 15 is a block diagram of another example DSDS communication device suitable for use with the various embodiments.

FIG. 15 illustrates another DSDS communication device in the form of a laptop computer 1500 suitable for use in the various embodiments described above. Many laptop computers include a touchpad touch surface 1517 that serves as the computer's pointing device, and thus may receive drag, scroll, and flick gestures similar to those implemented on mobile computing devices equipped with a touch screen display and described above. A laptop computer 1500 will typically include a processor 1511 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the computing device may include a computer mouse or trackball coupled to the processor (e.g., via a USB input) as are well known, which may also be use in conjunction with the various embodiments. The computer 1500 may have a first SIM card 1520 and a second SIM card 1522 that utilize a cellular telephone transceiver 1516 and one or more antennae 1508 to connect to a first and a second mobile network, respectively.

Figure 16:
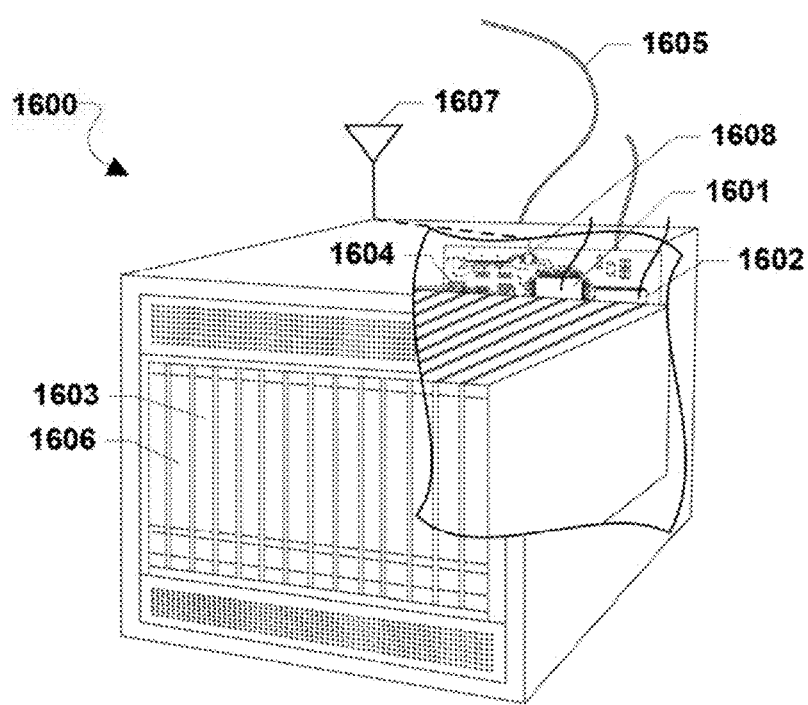
FIG. 16 is a block diagram of a server operating as part of a nodeB suitable for use with the various embodiments.

The various embodiments may be implemented on a nodeB that includes any of a variety of commercially available server devices, such as the server 1600 illustrated in FIG. 16. Such a server 1600 typically includes a processor 1601 coupled to volatile memory 1602 and a large capacity non-volatile memory, such as a disk drive 1603. The server 1600 may also include a floppy disc drive, compact disc (CD) or DVD disc drive 1606 coupled to the processor 1601. The server 1600 may also include network access ports 1604 coupled to the processor 1601 for establishing data connections with a network, such as a local area network coupled to other broadcast system computers and servers or to the Internet. The server may also utilize a transceiver 1608 coupled to one or more antennas 1607 and the processor 1601 when communicating with one or more UEs.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module that may reside on a non-transitory computer-readable or processor-readable storage medium (e.g., stored processor-executable software instructions). Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions (e.g., processor-executable instructions) or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of accommodating multi-subscriber identity module (SIM)-multi-standby communication device tuneaway events in a communication network base station, comprising:
   maintaining a tuneaway list of multi-SIM-multi-standby communication devices performing tuneaway;
   monitoring a signal strength of a multi-SIM-multi-standby communication device not included in the tuneaway list;
   performing tuneaway detection for the multi-SIM-multi-standby communication device in response to detecting a decrease in the signal strength of the multi-SIM-multi-standby communication device in order to determine whether the multi-SIM-multi-standby communication device is performing tuneaways; and
   adding the multi-SIM-multi-standby communication device to the tuneaway list in response to determining that the multi-SIM-multi-standby communication device is performing tuneaways.

2. The method of claim 1, wherein performing tuneaway detection for the multi-SIM-multi-standby communication device in response to detecting a decrease in the signal strength of the multi-SIM-multi-standby communication device comprises:
setting a tuneaway counter;
determining whether a decrease in the signal strength is a likely tuneaway gap;
incrementing the tuneaway counter in response to determining that the decrease in the signal strength is a likely tuneaway gap;
determining whether a threshold monitoring time has been reached;
continuing to monitor the multi-SIM-multi-standby communication device for a subsequent decrease in the signal strength in response to determining that the threshold monitoring time has not been reached;
determining whether the tuneaway counter has met or exceeded a tuneaway threshold in response to determining that the threshold monitoring time has been reached;
determining that the multi-SIM-multi-standby communication device is performing tuneaways in response to determining that the tuneaway counter has met or exceeded the tuneaway threshold; and
determining that the multi-SIM-multi-standby communication device is not performing tuneaways in response to determining that the tuneaway counter has not met or exceeded the tuneaway threshold.

3. The method of claim 2, wherein determining whether the decrease in the signal strength is a likely tuneaway gap comprises:
setting a timer;
starting the timer in response to detecting a decrease in the signal strength;
monitoring the signal strength until the signal strength exceeds a power threshold;
determining whether a value of the timer is greater than or equal to a time threshold when the signal strength exceeds the power threshold; and
determining that the decrease in the signal strength is not a likely tuneaway gap in response to determining that the value of the timer is not greater than or equal to the time threshold.

4. The method of claim 3, further comprising:
counting a number of times the multi-SIM-multi-standby communication device sends downlink transmitter power up requests during a certain observation period after the signal strength exceeds the power threshold in response to determining that the value of the timer is greater than or equal to the time threshold;
determining whether the number of times the multi-SIM-multi-standby communication device sends downlink transmitter power up requests is less than a request threshold;
determining that the decrease in the signal strength is not a likely tuneaway gap in response to determining that the number of times the multi-SIM-multi-standby communication device sends downlink transmitter power up requests is greater than or equal to the request threshold; and
determining that the decrease in the signal strength is a likely tuneaway gap in response to determining that the number of times the multi-SIM-multi-standby communication device sends downlink transmitter power up requests is less than the request threshold.

5. The method of claim 4, further comprising:
setting a variable P equal to a time from when the signal strength decreases below the power threshold until when the signal strength next decreases below the power threshold;
setting a variable D equal to a time from when the signal strength decreases below the power threshold to when the signal strength exceeds the power threshold; and
adding the multi-SIM-multi-standby communication device to the tuneaway list including identifying the multi-SIM-multi-standby communication device's tuneaway period as equal to the variable P and identifying the multi-SIM-multi-standby communication device's tuneaway duration as equal to the variable D.

6. The method of claim 1, further comprising:
determining a tuneaway pattern for the multi-SIM-multi-standby communication device, wherein the tuneaway pattern is the multi-SIM-multi-standby communication device's tuneaway duration and the multi-SIM-multi-standby communication device's tuneaway period;
determining when an expected tuneaway gap for the multi-SIM-multi-standby communication device will next occur;
monitoring the multi-SIM-multi-standby communication device until the expected tuneaway gap occurs; and
determining whether there is a decrease in the signal strength of the multi-SIM-multi-standby communication device at a time other than when a tuneaway gap is expected to begin.

7. The method of claim 6, further comprising removing the multi-SIM-multi-standby communication device from the tuneaway list in response to determining that there is a power gap in the signal strength of the multi-SIM-multi-standby communication device at a time other than when a tuneaway gap is expected to begin.

8. The method of claim 6, further comprising:
implementing a resource management strategy during the expected tuneaway gap; and
resuming normal resource management for the multi-SIM-multi-standby communication device after the expected tuneaway gap ends.

9. The method of claim 8, further comprising:
determining whether the signal strength of the multi-SIM-multi-standby communication device decreased during the expected tuneaway gap;
removing the multi-SIM-multi-standby communication device from the tuneaway list in response to determining that the signal strength of the multi-SIM-multi-standby communication device did not decrease during the expected tuneaway gap; and
determining when the expected tuneaway gap will next occur in response to determining that the signal strength of the multi-SIM-multi-standby communication device did decrease during the expected tuneaway gap.

10. The method of claim 8, wherein implementing the resource management strategy during the expected tuneaway gap comprises:
notifying a scheduler to ignore the multi-SIM-multi-standby communication device during the expected tuneaway gap;
stopping assignment of shared resources to the multi-SIM-multi-standby communication device during the expected tuneaway gap; and
resuming normal resource management for the multi-SIM-multi-standby communication device after the expected tuneaway gap is over.

11. The method of claim 8, wherein implementing the resource management strategy during the expected tuneaway gap comprises:
 scheduling at least one other communication device to receive resources assigned to the multi-SIM-multi-standby communication device during the expected tuneaway gap;
 providing the resources to the at least one other communication device during the expected tuneaway gap; and
 returning the resources to the multi-SIM-multi-standby communication device when the expected tuneaway gap is over.

12. The method of claim 8, wherein implementing the resource management strategy during the expected tuneaway gap comprises:
 freezing an outer loop signal-to-interference ratio target for the multi-SIM-multi-standby communication device when a tuneaway gap is expected to begin;
 waiting a duration of the expected tuneaway gap;
 detecting transmissions of the multi-SIM-multi-standby communication device when the expected tuneaway gap is over; and
 resuming normal resource management for the multi-SIM-multi-standby communication device after a cool-off period after when the expected tuneaway gap is over.

13. The method of claim 12, further comprising freezing power of dedicated channels to the multi-SIM-multi-standby communication device when a tuneaway gap is expected to begin.

14. A communication network base station, comprising:
 means for maintaining a tuneaway list of multi-subscriber identity module (SIM)-multi-standby communication devices performing tuneaway;
 means for monitoring a signal strength of a multi-SIM-multi-standby communication device not included in the tuneaway list;
 means for performing tuneaway detection for the multi-SIM-multi-standby communication device in response to detecting a decrease in the signal strength of the multi-SIM-multi-standby communication device in order to determine whether the multi-SIM-multi-standby communication device is performing tuneaways; and
 means for adding the multi-SIM-multi-standby communication device to the tuneaway list in response to determining that the multi-SIM-multi-standby communication device is performing tuneaways.

15. The communication network base station of claim 14, wherein means for performing tuneaway detection for the multi-SIM-multi-standby communication device in response to detecting a decrease in the signal strength of the multi-SIM-multi-standby communication device comprises:
 means for setting a tuneaway counter;
 means for determining whether a decrease in the signal strength is a likely tuneaway gap;
 means for incrementing the tuneaway counter in response to determining that the decrease in the signal strength is a likely tuneaway gap;
 means for determining whether a threshold monitoring time has been reached;
 means for continuing to monitor the multi-SIM-multi-standby communication device for a subsequent decrease in the signal strength in response to determining that the threshold monitoring time has not been reached;
 means for determining whether the tuneaway counter has met or exceeded a tuneaway threshold in response to determining that the threshold monitoring time has been reached;
 means for determining that the multi-SIM-multi-standby communication device is performing tuneaways in response to determining that the tuneaway counter has met or exceeded the tuneaway threshold; and
 means for determining that the multi-SIM-multi-standby communication device is not performing tuneaways in response to determining that the tuneaway counter has not met or exceeded the tuneaway threshold.

16. The communication network base station of claim 15, wherein means for determining whether the decrease in the signal strength is a likely tuneaway gap comprises:
 means for setting a timer;
 means for starting the timer in response to detecting a decrease in the signal strength;
 means for monitoring the signal strength until the signal strength exceeds a power threshold;
 means for determining whether a value of the timer is greater than or equal to a time threshold when the signal strength exceeds the power threshold; and
 means for determining that the decrease in the signal strength is not a likely tuneaway gap in response to determining that the value of the timer is not greater than or equal to the time threshold.

17. The communication network base station of claim 16, further comprising:
 means for counting a number of times the multi-SIM-multi-standby communication device sends downlink transmitter power up requests during a certain observation period after the signal strength exceeds the power threshold in response to determining that the value of the timer is greater than or equal to the time threshold;
 means for determining whether the number of times the multi-SIM-multi-standby communication device sends downlink transmitter power up requests is less than a request threshold;
 means for determining that the decrease in the signal strength is not a likely tuneaway gap in response to determining that the number of times the multi-SIM-multi-standby communication device sends downlink transmitter power up requests is greater than or equal to the request threshold; and
 means for determining that the decrease in the signal strength is a likely tuneaway gap in response to determining that the number of times the multi-SIM-multi-standby communication device sends downlink transmitter power up requests is less than the request threshold.

18. The communication network base station of claim 17, further comprising:
 means for setting a variable P equal to a time from when the signal strength decreases below the power threshold until when the signal strength next decreases below the power threshold;
 means for setting a variable D equal to a time from when the signal strength decreases below the power threshold to when the signal strength exceeds the power threshold; and
 means for adding the multi-SIM-multi-standby communication device to the tuneaway list including identifying the multi-SIM-multi-standby communication device's tuneaway period as equal to the variable P and identifying the multi-SIM-multi-standby communication device's tuneaway duration as equal to the variable D.

19. The communication network base station of claim 14, further comprising:
  means for determining a tuneaway pattern for the multi-SIM-multi-standby communication device, wherein the tuneaway pattern is the multi-SIM-multi-standby communication device's tuneaway duration and the multi-SIM-multi-standby communication device's tuneaway period;
  means for determining when an expected tuneaway gap for the multi-SIM-multi-standby communication device will next occur;
  means for monitoring the multi-SIM-multi-standby communication device until the expected tuneaway gap occurs; and
  means for determining whether there is a decrease in the signal strength of the multi-SIM-multi-standby communication device at a time other than when a tuneaway gap is expected to begin.

20. The communication network base station of claim 19, further comprising means for removing the multi-SIM-multi-standby communication device from the tuneaway list in response to determining that there is a power gap in the signal strength of the multi-SIM-multi-standby communication device at a time other than when a tuneaway gap is expected to begin.

21. The communication network base station of claim 19, further comprising:
  means for implementing a resource management strategy during the expected tuneaway gap; and
  means for resuming normal resource management for the multi-SIM-multi-standby communication device after the expected tuneaway gap ends.

22. The communication network base station of claim 21, further comprising:
  means for determining whether the signal strength of the multi-SIM-multi-standby communication device decreased during the expected tuneaway gap;
  means for removing the multi-SIM-multi-standby communication device from the tuneaway list in response to determining that the signal strength of the multi-SIM-multi-standby communication device did not decrease during the expected tuneaway gap; and
  means for determining when the expected tuneaway gap will next occur in response to determining that the signal strength of the multi-SIM-multi-standby communication device did decrease during the expected tuneaway gap.

23. The communication network base station of claim 21, wherein means for implementing the resource management strategy during the expected tuneaway gap comprises:
  means for notifying a scheduler to ignore the multi-SIM-multi-standby communication device during the expected tuneaway gap;
  means for stopping assignment of shared resources to the multi-SIM-multi-standby communication device during the expected tuneaway gap; and
  means for resuming normal resource management for the multi-SIM-multi-standby communication device after the expected tuneaway gap is over.

24. The communication network base station of claim 21, wherein means for implementing the resource management strategy during the expected tuneaway gap comprises:
  means for scheduling at least one other communication device to receive resources assigned to the multi-SIM-multi-standby communication device during the expected tuneaway gap;
  means for providing the resources to the at least one other communication device during the expected tuneaway gap; and
  means for returning the resources to the multi-SIM-multi-standby communication device when the expected tuneaway gap is over.

25. The communication network base station of claim 21, wherein means for implementing the resource management strategy during the expected tuneaway gap comprises:
  means for freezing an outer loop signal-to-interference ratio target for the multi-SIM-multi-standby communication device when a tuneaway gap is expected to begin;
  means for waiting a duration of the expected tuneaway gap;
  means for detecting transmissions of the multi-SIM-multi-standby communication device when the expected tuneaway gap is over; and
  means for resuming normal resource management for the multi-SIM-multi-standby communication device after a cool-off period after when the expected tuneaway gap is over.

26. The communication network base station of claim 25, further comprising means for freezing power of dedicated channels to the multi-SIM-multi-standby communication device when a tuneaway gap is expected to begin.

27. A communication network base station, comprising:
  a processor configured with processor-executable instructions to:
    maintain a tuneaway list of multi-subscriber identity module (SIM)-multi-standby communication devices performing tuneaway;
    monitor a signal strength of a multi-SIM-multi-standby communication device not included in the tuneaway list;
    perform tuneaway detection for the multi-SIM-multi-standby communication device in response to detecting a decrease in the signal strength of the multi-SIM-multi-standby communication device in order to determine whether the multi-SIM-multi-standby communication device is performing tuneaways; and
    add the multi-SIM-multi-standby communication device to the tuneaway list in response to determining that the multi-SIM-multi-standby communication device is performing tuneaways.

28. The communication network base station of claim 27, wherein the processor is configured with processor-executable instructions to perform tuneaway detection for the multi-SIM-multi-standby communication device in response to detecting a decrease in the signal strength of the multi-SIM-multi-standby communication device by:
  setting a tuneaway counter;
  determining whether a decrease in the signal strength is a likely tuneaway gap;
  incrementing the tuneaway counter in response to determining that the decrease in the signal strength is a likely tuneaway gap;
  determining whether a threshold monitoring time has been reached;
  continuing to monitor the multi-SIM-multi-standby communication device for a subsequent decrease in the signal strength in response to determining that the threshold monitoring time has not been reached;
  determining whether the tuneaway counter has met or exceeded a tuneaway threshold in response to determining that the threshold monitoring time has been reached;
  determining that the multi-SIM-multi-standby communication device is performing tuneaways in response to determining that the tuneaway counter has met or exceeded the tuneaway threshold; and determining that the multi-SIM-multi-standby communication device is not performing tuneaways in response to determining that the tuneaway counter has not met or exceeded the tuneaway threshold.

29. The communication network base station of claim 28, wherein the processor is configured with processor-executable instructions to determine whether the decrease in the signal strength is a likely tuneaway gap by:

setting a timer;

starting the timer in response to detecting a decrease in the signal strength;

monitoring the signal strength until the signal strength exceeds a power threshold;

determining whether a value of the timer is greater than or equal to a time threshold when the signal strength exceeds the power threshold; and determining that the decrease in the signal strength is not a likely tuneaway gap in response to determining that the value of the timer is not greater than or equal to the time threshold.

30. The communication network base station of claim 29, wherein the processor is further configured with processor-executable instructions to:

count a number of times the multi-SIM-multi-standby communication device sends downlink transmitter power up requests during a certain observation period after the signal strength exceeds the power threshold in response to determining that the value of the timer is greater than or equal to the time threshold;

determine whether the number of times the multi-SIM-multi-standby communication device sends downlink transmitter power up requests is less than a request threshold;

determine that the decrease in the signal strength is not a likely tuneaway gap in response to determining that the number of times the multi-SIM-multi-standby communication device sends downlink transmitter power up requests is greater than or equal to the request threshold; and determine that the decrease in the signal strength is a likely tuneaway gap in response to determining that the number of times the multi-SIM-multi-standby communication device sends downlink transmitter power up requests is less than the request threshold.

31. The communication network base station of claim 30, wherein the processor is further configured with processor-executable instructions to:

set a variable P equal to a time from when the signal strength decreases below the power threshold until when the signal strength next decreases below the power threshold;

set a variable D equal to a time from when the signal strength decreases below the power threshold to when the signal strength exceeds the power threshold; and add the multi-SIM-multi-standby communication device to the tuneaway list including identifying the multi-SIM-multi-standby communication device's tuneaway period as equal to the variable P and identifying the multi-SIM-multi-standby communication device's tuneaway duration as equal to the variable D.

32. The communication network base station of claim 27, wherein the processor is further configured with processor-executable instructions to:

determine a tuneaway pattern for the multi-SIM-multi-standby communication device, wherein the tuneaway pattern is the multi-SIM-multi-standby communication device's tuneaway duration and the multi-SIM-multi-standby communication device's tuneaway period;

determine when an expected tuneaway gap for the multi-SIM-multi-standby communication device will next occur;

monitor the multi-SIM-multi-standby communication device until the expected tuneaway gap occurs; and determine whether there is a decrease in the signal strength of the multi-SIM-multi-standby communication device at a time other than when a tuneaway gap is expected to begin.

33. The communication network base station of claim 32, wherein the processor is further configured with processor-executable instructions to remove the multi-SIM-multi-standby communication device from the tuneaway list in response to determining that there is a power gap in the signal strength of the multi-SIM-multi-standby communication device at a time other than when a tuneaway gap is expected to begin.

34. The communication network base station of claim 32, wherein the processor is further configured with processor-executable instructions to:

implement a resource management strategy during the expected tuneaway gap; and result normal resource management for the multi-SIM-multi-standby communication device after the expected tuneaway gap ends.

35. The communication network base station of claim 34, wherein the processor is further configured with processor-executable instructions to:

determine whether the signal strength of the multi-SIM-multi-standby communication device decreased during the expected tuneaway gap;

remove the multi-SIM-multi-standby communication device from the tuneaway list in response to determining that the signal strength of the multi-SIM-multi-standby communication device did not decrease during the expected tuneaway gap; and determine when the expected tuneaway gap will next occur in response to determining that the signal strength of the multi-SIM-multi-standby communication device did decrease during the expected tuneaway gap.

36. The communication network base station of claim 34, wherein the processor is further configured with processor-executable instructions to implement the resource management strategy during the expected tuneaway gap by:

notifying a scheduler to ignore the multi-SIM-multi-standby communication device during the expected tuneaway gap;

stopping assignment of shared resources to the multi-SIM-multi-standby communication device during the expected tuneaway gap; and resuming normal resource management for the multi-SIM-multi-standby communication device after the expected tuneaway gap is over.

37. The communication network base station of claim 34, wherein the processor is configured with processor-executable instructions to implement the resource management strategy during the expected tuneaway gap by:

scheduling at least one other communication device to receive resources assigned to the multi-SIM-multi-standby communication device during the expected tuneaway gap;

providing the resources to the at least one other communication device during the expected tuneaway gap; and returning the resources to the multi-SIM-multi-standby communication device when the expected tuneaway gap is over.

38. The communication network base station of claim 34, wherein the processor is configured with processor-executable instructions to implement the resource management strategy during the expected tuneaway gap by:
   freezing an outer loop signal-to-interference ratio target for the multi-SIM-multi-standby communication device when a tuneaway gap is expected to begin;
   waiting a duration of the expected tuneaway gap;
   detecting transmissions of the multi-SIM-multi-standby communication device when the expected tuneaway gap is over; and
   resuming normal resource management for the multi-SIM-multi-standby communication device after a cool-off period after when the expected tuneaway gap is over.

39. The communication network base station of claim 38, wherein the processor is further configured with processor-executable instructions to freeze power of dedicated channels to the multi-SIM-multi-standby communication device when a tuneaway gap is expected to begin.

40. A non-transitory processor-readable storage medium having stored thereon processor-executable software instructions configured to cause a processor of a communication network base station to perform operations comprising:
   maintaining a tuneaway list of multi-subscriber identity module (SIM)-multi-standby communication devices performing tuneaway;
   monitoring a signal strength of a multi-SIM-multi-standby communication device not included in the tuneaway list;
   performing tuneaway detection for the multi-SIM-multi-standby communication device in response to detecting a decrease in the signal strength of the multi-SIM-multi-standby communication device in order to determine whether the multi-SIM-multi-standby communication device is performing tuneaways; and
   adding the multi-SIM-multi-standby communication device to the tuneaway list in response to determining that the multi-SIM-multi-standby communication device is performing tuneaways.

41. The non-transitory processor-readable storage medium of claim 40, wherein the stored processor-executable software instructions are configured to cause a processor of a communication network base station to perform operations such that performing tuneaway detection for the multi-SIM-multi-standby communication device in response to detecting a decrease in the signal strength of the multi-SIM-multi-standby communication device comprises:
   setting a tuneaway counter;
   determining whether a decrease in the signal strength is a likely tuneaway gap;
   incrementing the tuneaway counter in response to determining that the decrease in the signal strength is a likely tuneaway gap;
   determining whether a threshold monitoring time has been reached;
   continuing to monitor the multi-SIM-multi-standby communication device for a subsequent decrease in the signal strength in response to determining that the threshold monitoring time has not been reached;
   determining whether the tuneaway counter has met or exceeded a tuneaway threshold in response to determining that the threshold monitoring time has been reached;
   determining that the multi-SIM-multi-standby communication device is performing tuneaways in response to determining that the tuneaway counter has met or exceeded the tuneaway threshold; and
   determining that the multi-SIM-multi-standby communication device is not performing tuneaways in response to determining that the tuneaway counter has not met or exceeded the tuneaway threshold.

42. The non-transitory processor-readable storage medium of claim 41, wherein the stored processor-executable software instructions are configured to cause a processor of a communication network base station to perform operations such that determining whether the decrease in the signal strength is a likely tuneaway gap comprises:
   setting a timer;
   starting the timer in response to detecting a decrease in the signal strength;
   monitoring the signal strength until the signal strength exceeds a power threshold;
   determining whether a value of the timer is greater than or equal to a time threshold when the signal strength exceeds the power threshold; and
   determining that the decrease in the signal strength is not a likely tuneaway gap in response to determining that the value of the timer is not greater than or equal to the time threshold.

43. The non-transitory processor-readable storage medium of claim 42, wherein the stored processor-executable software instructions are configured to cause a processor of a communication network base station to perform operations further comprising:
   counting a number of times the multi-SIM-multi-standby communication device sends downlink transmitter power up requests during a certain observation period after the signal strength exceeds the power threshold in response to determining that the value of the timer is greater than or equal to the time threshold;
   determining whether the number of times the multi-SIM-multi-standby communication device sends downlink transmitter power up requests is less than a request threshold;
   determining that the decrease in the signal strength is not a likely tuneaway gap in response to determining that the number of times the multi-SIM-multi-standby communication device sends downlink transmitter power up requests is greater than or equal to the request threshold; and
   determining that the decrease in the signal strength is a likely tuneaway gap in response to determining that the number of times the multi-SIM-multi-standby communication device sends downlink transmitter power up requests is less than the request threshold.

44. The non-transitory processor-readable storage medium of claim 43, wherein the stored processor-executable software instructions are configured to cause a processor of a communication network base station to perform operations further comprising:
   setting a variable P equal to a time from when the signal strength decreases below the power threshold until when the signal strength next decreases below the power threshold;
   setting a variable D equal to a time from when the signal strength decreases below the power threshold to when the signal strength exceeds the power threshold; and
   adding the multi-SIM-multi-standby communication device to the tuneaway list including identifying the multi-SIM-multi-standby communication device's tuneaway period as equal to the variable P and identifying the multi-SIM-multi-standby communication device's tuneaway duration as equal to the variable D.

45. The non-transitory processor-readable storage medium of claim 40, wherein the stored processor-executable software instructions are configured to cause a processor of a communication network base station to perform operations further comprising:
- determining a tuneaway pattern for the multi-SIM-multi-standby communication device, wherein the tuneaway pattern is the multi-SIM-multi-standby communication device's tuneaway duration and the multi-SIM-multi-standby communication device's tuneaway period;
- determining when an expected tuneaway gap for the multi-SIM-multi-standby communication device will next occur;
- monitoring the multi-SIM-multi-standby communication device until the expected tuneaway gap occurs; and
- determining whether there is a decrease in the signal strength of the multi-SIM-multi-standby communication device at a time other than when a tuneaway gap is expected to begin.

46. The non-transitory processor-readable storage medium of claim 45, wherein the stored processor-executable software instructions are configured to cause a processor of a communication network base station to perform operations further comprising removing the multi-SIM-multi-standby communication device from the tuneaway list in response to determining that there is a power gap in the signal strength of the multi-SIM-multi-standby communication device at a time other than when a tuneaway gap is expected to begin.

47. The non-transitory processor-readable storage medium of claim 45, wherein the stored processor-executable software instructions are configured to cause a processor of a communication network base station to perform operations further comprising:
- implementing a resource management strategy during the expected tuneaway gap; and
- resuming normal resource management for the multi-SIM-multi-standby communication device after the expected tuneaway gap ends.

48. The non-transitory processor-readable storage medium of claim 47, wherein the stored processor-executable software instructions are configured to cause a processor of a communication network base station to perform operations further comprising:
- determining whether the signal strength of the multi-SIM-multi-standby communication device decreased during the expected tuneaway gap;
- removing the multi-SIM-multi-standby communication device from the tuneaway list in response to determining that the signal strength of the multi-SIM-multi-standby communication device did not decrease during the expected tuneaway gap; and
- determining when the expected tuneaway gap will next occur in response to determining that the signal strength of the multi-SIM-multi-standby communication device did decrease during the expected tuneaway gap.

49. The non-transitory processor-readable storage medium of claim 47, wherein the stored processor-executable software instructions are configured to cause a processor of a communication network base station to perform operations such that implementing the resource management strategy during the expected tuneaway gap comprises:
- notifying a scheduler to ignore the multi-SIM-multi-standby communication device during the expected tuneaway gap;
- stopping assignment of shared resources to the multi-SIM-multi-standby communication device during the expected tuneaway gap; and
- resuming normal resource management for the multi-SIM-multi-standby communication device after the expected tuneaway gap is over.

50. The non-transitory processor-readable storage medium of claim 47, wherein the stored processor-executable software instructions are configured to cause a processor of a communication network base station to perform operations such that implementing the resource management strategy during the expected tuneaway gap comprises:
- scheduling at least one other communication device to receive resources assigned to the multi-SIM-multi-standby communication device during the expected tuneaway gap;
- providing the resources to the at least one other communication device during the expected tuneaway gap; and
- returning the resources to the multi-SIM-multi-standby communication device when the expected tuneaway gap is over.

51. The non-transitory processor-readable storage medium of claim 47, wherein the stored processor-executable software instructions are configured to cause a processor of a communication network base station to perform operations such that implementing the resource management strategy during the expected tuneaway gap comprises:
- freezing an outer loop signal-to-interference ratio target for the multi-SIM-multi-standby communication device when a tuneaway gap is expected to begin;
- waiting a duration of the expected tuneaway gap;
- detecting transmissions of the multi-SIM-multi-standby communication device when the expected tuneaway gap is over; and
- resuming normal resource management for the multi-SIM-multi-standby communication device after a cool-off period after when the expected tuneaway gap is over.

52. The non-transitory processor-readable storage medium of claim 51, wherein the stored processor-executable software instructions are configured to cause a processor of a communication network base station to perform operations further comprising freezing power of dedicated channels to the multi-SIM-multi-standby communication device when a tuneaway gap is expected to begin.

\* \* \* \* \*